United States Patent
Funada

[11] Patent Number: 5,838,817
[45] Date of Patent: Nov. 17, 1998

[54] IMAGE PROCESSING APPARATUS AND METHOD FOR CODING AND DECODING CHROMATICITY INFORMATION

[75] Inventor: Masahiro Funada, Yokohama, Japan

[73] Assignee: Canon Kabushiki Kaisha, Tokyo, Japan

[21] Appl. No.: 451,973

[22] Filed: May 26, 1995

Related U.S. Application Data

[63] Continuation of Ser. No. 46,269, Apr. 15, 1993, abandoned.

[30] Foreign Application Priority Data

Apr. 17, 1992 [JP] Japan .................................. 4-097810

[51] Int. Cl.$^6$ .................................................. G06T 9/00
[52] U.S. Cl. ......................... 382/166; 382/233; 382/248; 358/433; 358/539
[58] Field of Search ................................... 358/500, 501, 358/520, 539; 348/717, 393, 395, 396, 663, 703; 382/166, 162, 167, 165, 232

[56] References Cited

U.S. PATENT DOCUMENTS

| | | | |
|---|---|---|---|
| 4,797,945 | 1/1989 | Suzuki et al. | 382/253 |
| 4,887,151 | 12/1989 | Wataya | 358/539 |
| 4,949,166 | 8/1990 | Isnardi | 348/493 |
| 4,974,071 | 11/1990 | Maeda | 358/539 |
| 4,982,270 | 1/1991 | Tanaka et al. | 348/396 |
| 5,023,919 | 6/1991 | Wataya | 382/233 |
| 5,060,280 | 10/1991 | Mita et al. | 382/283 |
| 5,089,884 | 2/1992 | Suzuki et al. | 358/359 |
| 5,157,743 | 10/1992 | Maeda et al. | 382/248 |
| 5,165,072 | 11/1992 | Kurita et al. | 358/448 |
| 5,227,871 | 7/1993 | Funada et al. | 358/500 |
| 5,488,670 | 1/1996 | Suzuki et al. | 382/165 |

FOREIGN PATENT DOCUMENTS

| | | |
|---|---|---|
| 1311786 | 12/1989 | Japan . |
| 3064165 | 3/1991 | Japan . |

OTHER PUBLICATIONS

Gonzalez et al. *Digital Image Processing*, 1992, pp. 197–201.

*Primary Examiner*—Jon Chang
*Attorney, Agent, or Firm*—Fitzpatrick, Cella, Harper & Scinto

[57] ABSTRACT

When a pixel block of a color image is coded, the coding is performed by taking the correlation between lightness and chromaticity into account. More specifically, the color data within the pixel block is separated into lightness and chromaticity. Lightness is coded by being subjected to an orthogonal transformation. The coding of chromaticity is performed by detecting the average value of chromaticity and the amplitude of chromaticity of a pixel block, calculating the ratio of chromaticity amplitude to lightness amplitude and then coding chromaticity based upon the calculated ratio and the average value of chromaticity.

32 Claims, 36 Drawing Sheets

FIG. 12

| $K_1 \cap K_2$ | COLOR DEVELOPED | $a_1$ | $a_2$ | $a_3$ | $a_4$ | REMARKS |
|---|---|---|---|---|---|---|
| 0 | M | $a_{11}$ | $a_{21}$ | $a_{31}$ | $a_{41}$ | NON-BLACK CHARACTER ; MAGENTA |
| | C | $a_{12}$ | $a_{22}$ | $a_{32}$ | $a_{42}$ | NON-BLACK CHARACTER ; CYAN |
| | Y | $a_{13}$ | $a_{23}$ | $a_{33}$ | $a_{43}$ | NON-BLACK CHARACTER ; YELLOW |
| | Bk | $a_{14}$ | $a_{24}$ | $a_{34}$ | $a_{44}$ | NON-BLACK CHARACTER ; BLACK |
| 1 | M | 0 | 0 | 0 | 0 | BLACK CHARACTER ; MAGENTA |
| | C | 0 | 0 | 0 | 0 | BLACK CHARACTER ; CYAN |
| | Y | 0 | 0 | 0 | 0 | BLACK CHARACTER ; YELLOW |
| | Bk | $a'_{14}$ | 0 | 0 | 0 | BLACK CHARACTER ; BLACK |

FIG. 26

```
            XPHS
         0   1   2   3   0   1   2   3 ------
       +---+---+---+---+
    0  |X11|X12|X13|X14|
       +---+---+---+---+
    1  |X21|X22|X23|X24|
YPHS   +---+---+---+---+
    2  |X31|X32|X33|X34|
       +---+---+---+---+
    3  |X41|X42|X43|X44|
       +---+---+---+---+
    0
    1
    2
    3
    ⋮
```

F I G. 28

| K2 | b0 | b1 | b2 | TYPE OF FILTER |
|---|---|---|---|---|
| 0 | $\frac{4}{8}$ = b01 | $\frac{1}{8}$ = b11 | $\frac{1}{8}$ = b21 | SMOOTHING FILTER $\frac{1}{8} \begin{bmatrix} 1 & 1 & 1 \\ 1 & 4 & 1 \\ 1 & 1 & 1 \end{bmatrix}$ |
| 1 | $\frac{12}{8}$ = b02 | $-\frac{1}{8}$ = b12 | $-\frac{1}{8}$ = b22 | EDGE EMPHASIZING FILTER $\frac{1}{8} \begin{bmatrix} -1 & -1 & -1 \\ -1 & 12 & -1 \\ -1 & -1 & -1 \end{bmatrix}$ |

IMAGE PROCESSING APPARATUS AND METHOD FOR CODING AND DECODING CHROMATICITY INFORMATION

This application is a continuation of application Ser. No. 08/046,269 filed Apr. 15, 1993, now abandoned.

BACKGROUND OF THE INVENTION

This invention relates to an image processing apparatus and, more particularly, to an image processing apparatus for coding/decoding a color image.

An image processing technique for coding a color image read in by an image scanner or the like is disclosed in the specification of Japanese Patent Application 63-141826 (U.S. Pat. No. 5,089,884), by way of example. According to this technique, the image is separated into lightness information and chromaticity information in units of pixel blocks of a predetermined size, and these items of information are coded.

In the prior art described above, the items of lightness information and chromaticity information of a pixel block are coded independently. However, the items of lightness information and chromaticity information possess a certain degree of correlativity. Consequently, when the above-described prior art in which these items of information are coded completely independently is employed, a high-quality image cannot be reproduced.

Further, in the coding of an image, an entered pixel block is subjected to an orthogonal transformation and the transformed pixel block is then coded. At the decoding stage, therefore, it is necessary to decode the coded data and apply a reverse orthogonal transformation. Accordingly, the circuit configuration inevitably is complicated and coding is performed over several steps. This means that the error in each stage of processing is enlarged. As a result, a coded image cannot be decoded into an image having a high quality.

Further, in a case where decoding is performed, it has been contemplated to supply the coded data as the address of a look-up table, thereby simplifying the circuitry. In order to suppress a decline in picture quality, however, a certain degree of code length must be assured and therefore the number of address bits inputted to the look-up table inevitably is large. As a result, the memory space managed by the look-up table becomes very large, and decoding processing with regard to a code length in excess of a certain size cannot be realized with a look-up table.

SUMMARY OF THE INVENTION

An object of the present invention is to provide an image processing apparatus in which coding/decoding is made possible while a picture quality higher than that of the prior art is maintained.

According to the present invention, the foregoing object is attained by providing an image processing apparatus comprising: separating means, to which a full-color image is inputted in pixel blocks of n×m pixels, for separating each pixel constituting an entered pixel block into lightness information and chromaticity information; quantizing means for separating the separated lightness information within one pixel block into a DC component value and an AC component value and quantizing these component values; first calculating means for calculating the amplitude value of the lightness information within the pixel block; second calculating means for calculating the amplitude value and average value of the chromaticity information based upon the chromaticity information separated by the separating means; and coding means for coding a pixel block of interest based upon the DC component value and AC component value quantized by said quantizing means, a ratio of the amplitude value of the chromaticity information to the amplitude value of the lightness information and the average value of chromaticity.

Further, the invention provides an image processing apparatus for decoding data that has been coded by an apparatus having: separating means, to which a full-color image is inputted in pixel blocks of n×m pixels, for separating each pixel constituting an entered pixel block into lightness information and chromaticity information; orthogonal transformation means for orthogonally transforming the lightness information of the pixel block in order to obtain a DC component value and an AC component value of the separated lightness information within one pixel block; first calculating means for calculating the amplitude value of the lightness information within the pixel block; second calculating means for calculating the amplitude value and average value of the chromaticity information based upon the chromaticity information separated by the separating means; and coding means for coding a pixel block of interest based upon the DC component value and AC component value obtained by said orthogonal transformation means, a ratio of the amplitude value of the chromaticity information to the amplitude value of the lightness information and the average value of chromaticity; said image processing apparatus comprising: reverse orthogonal transformation means for reverse-orthogonally transforming the AC component of the coded lightness information; lightness decoding means for decoding the lightness information of each pixel position within the pixel block by adding the coded DC component to the value obtained by the reverse orthogonal transformation; multiplying means for multiplying the coded chromaticity ratio by the transformed value of each pixel position obtained by said reverse-orthogonal transformation means; and chromaticity decoding means for decoding the chromaticity information of each pixel position within the pixel block by adding the value obtained by said multiplying means and the coded chromaticity average value.

Further, the invention provides an image processing apparatus for subdividing a given color image into pixel blocks of n×m pixels and coding the color image in units of the pixel blocks resulting from subdivision, comprising: converting means for converting individual pixels, which constitute each pixel block, into lightness information and chromaticity information; orthogonal transformation means for orthogonally transforming the lightness information of a pixel block of interest in order to obtain a DC component and an AC component of the lightness information within the pixel block of interest; first calculating means for calculating a difference between maximum lightness and minimum lightness within the pixel block of interest; second calculating means for calculating a difference between chromaticity corresponding to a pixel position of maximum lightness within the pixel block of interest and chromaticity corresponding to a pixel position of minimum lightness within the pixel block of interest; third calculating means for calculating a ratio of the chromaticity difference calculated by said second calculating means to the chromaticity difference calculated by said first calculating means; fourth calculating means for calculating an average value of chromaticity within the pixel block of interest; and coding means for coding the pixel block of interest based upon the DC component and AC component of chromaticity obtained by said orthogonal transformation means, the ratio calculated by said third calculating means and the average value of chromaticity calculated by said fourth calculating means.

Further, the invention provides an image processing apparatus for decoding data that has been coded by an apparatus having: converting means for subdividing a given color image into pixel blocks of n×m pixels and converting individual pixels, which constitute each pixel block, into lightness information and chromaticity information; orthogonal transformation means for orthogonally transforming the lightness information of a pixel block of interest in order to obtain a DC component and an AC component of the lightness information within the pixel block of interest; first calculating means for calculating a difference between maximum lightness and minimum lightness within the pixel block of interest; second calculating means for calculating a difference between chromaticity corresponding to a pixel position of maximum lightness within the pixel block of interest and chromaticity corresponding to a pixel position of minimum lightness within the pixel block of interest; third calculating means for calculating a ratio of the chromaticity difference calculated by said second calculating means to the chromaticity difference calculated by said first calculating means; fourth calculating means for calculating an average value of chromaticity within the pixel block of interest; and coding means for coding the pixel block of interest based upon the DC component and AC component of chromaticity obtained by said orthogonal transformation means, the ratio calculated by said third calculating means and the average value of chromaticity calculated by said fourth calculating means; said image processing means comprising: reverse orthogonal transformation means for reverse-orthogonally transforming the AC component of the coded lightness information; lightness decoding means for decoding the lightness information of each pixel position within the pixel block by adding the coded DC component to the value obtained by the reverse orthogonal transformation; multiplying means for multiplying the coded chromaticity ratio by the transformed value of each pixel position obtained by said reverse-orthogonal transformation means; and chromaticity decoding means for decoding the chromaticity information of each pixel position within the pixel block by adding the value obtained by said multiplying means and the coded chromaticity average value.

Another object of the present invention is to provide an image processing apparatus in which the configuration of the circuitry for decoding is simplified.

According to the present invention, the foregoing object is attained by providing an image processing apparatus comprising: separating means, to which a color image is inputted in pixel blocks of n×m pixels, for separating each pixel within the pixel block into a lightness value and a chromaticity value; generating means for orthogonally transforming lightness information corresponding to the separated n×m pixels and generating orthogonal transformation data of every frequency band; grouping means for grouping the orthogonal transformation data, which has been generated by said generating means, according to a predetermined number of frequency bands; quantizing means for quantizing chromaticity information of the separated n×m pixels; coding means for coding a pixel block of interest based upon the chromaticity information quantized by said quantizing means and the orthogonal transformation data in units of the frequency bands grouped by said grouping means; chromaticity-information decoding means for decoding the chromaticity information of the pixel block of interest based upon the coded data coded by said coding means; and lightness-information decoding means for decoding the lightness information of the pixel block of interest based upon the coded data coded by said coding means; said lightness-information decoding means including: look-up tables the number of which corresponds to the number of groups, each look-up table storing decoded lightness information; first address supply means for supplying each of said look-up tables with addresses, said addresses being pixel-position data for specifying a pixel position of the pixel block; and second address supply means for supplying each of said look-up tables with addresses, said addresses being one item of the grouped orthogonal transformation data; data generated from each of said look-up tables by said first and second address supply means being generated as decoded data of lightness of each pixel position of the pixel block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram showing values set in registers in FIG. 11;

FIG. 26 is a diagram showing a pixel block of a total of 16 pixels, namely four main-scan pixels and four sub-scan pixels;

FIG. 28 is a diagram showing an example of values held in registers in FIG. 27;

DESCRIPTION OF THE PREFERRED EMBODIMENTS

Preferred embodiments of the present invention will now be described in detail with reference to the accompanying drawing.

(First Embodiment)

The details of a full-color copier will be described as a preferred embodiment of the present invention. It should be noted, however, that the invention is not limited to this embodiment but can be applied generally to any apparatus (such as a facsimile machine) that codes and decodes an image.

[Overview of apparatus]

Figure 3:
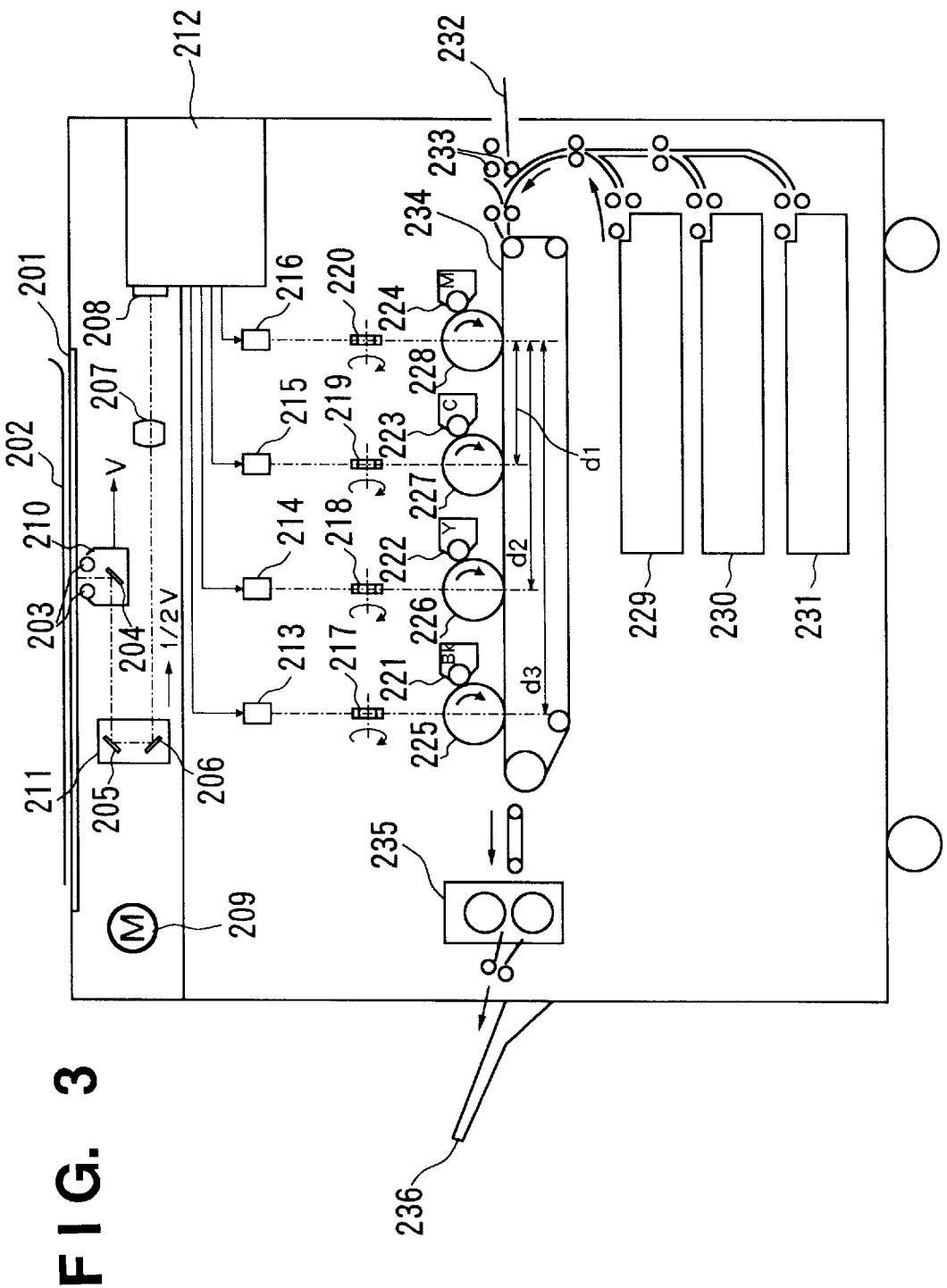
FIG. 3 is a sectional view showing the structure of a full-color copier according to the invention.

FIG. 3 is a sectional view showing the structure of a full-color copier according to the first embodiment of the invention.

As shown in FIG. 3, the copier includes a glass platen 201 on which an original 202 to be read is placed. The original 202 is irradiated by an illuminating device 203, and light reflected from the original has its image formed on a CCD 208 by an optical system 207 via mirrors 204, 205, 206. A mirror unit 210 15 including the mirror 204 and the illuminating device 203 is driven mechanically by a motor 209 at a speed V, and a second mirror unit 211 that includes the mirrors 205, 206 is driven at a speed 1/2V so that the entire original 202 is scanned. As a result, the length of the optical path from the original to the CCD 208 is constant.

An image processing circuit 212 processes read image information as an electric signal and outputs the results as print signals.

Semiconductor lasers 213, 214, 215, 216 are driven by the print signals outputted by the image processing circuit 212. Beams of laser light emitted by respective ones of the semiconductor lasers 213, 214, 215, 216 form latent images on photosensitive drums 225, 226, 227, 228, respectively, via polygon mirrors 217, 218, 219, 220, respectively. Developing units 221, 222, 223, 224 develop the latent images by toners of the colors black (Bk), yellow (Y), cyan (C) and magenta (M), respectively. The toner of color of each developed latent image is transferred to paper to produce a full-color printout.

Paper supplied from any one of paper cassettes 229, 230, 231 or from a manual-insertion tray 232 enters via resist rollers and is conveyed by a transfer belt 234 while clinging to the belt. In synchronism with the timing of paper feed, the toners of the aforementioned colors first are developed on the respective photosensitive drums 228, 227, 226, 225 and then are transferred to the paper as the paper is conveyed.

The paper to which the color toners have been transferred is conveyed, the toners are fixed on the paper by a fixing unit 235 and the paper is then discharged into a discharge tray 2236.

[Flow of electric signals]

Figure 1:
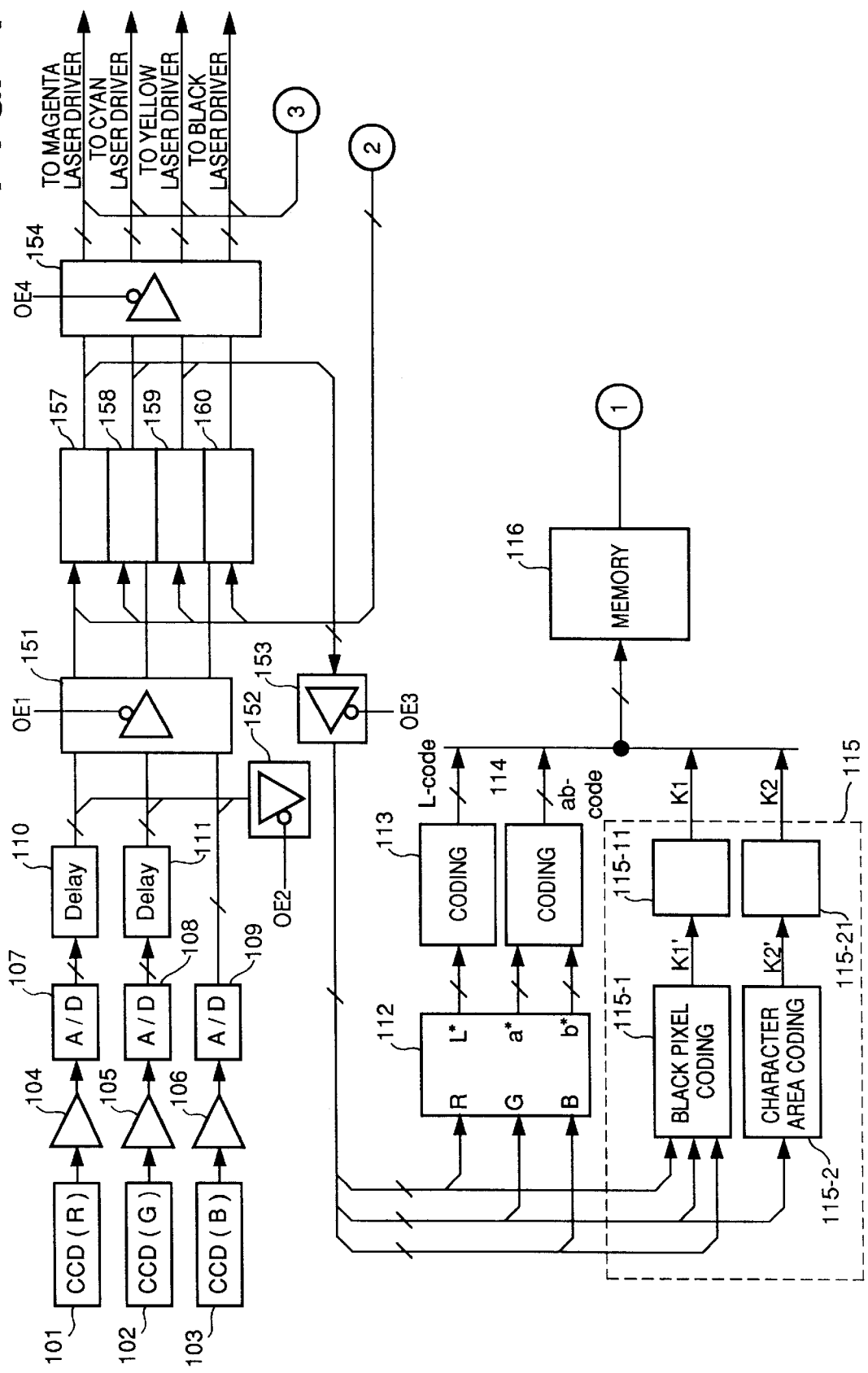
FIGS. 1 and 2 are block diagrams illustrating an image processing circuit according to an embodiment of the invention.
Figure 2:
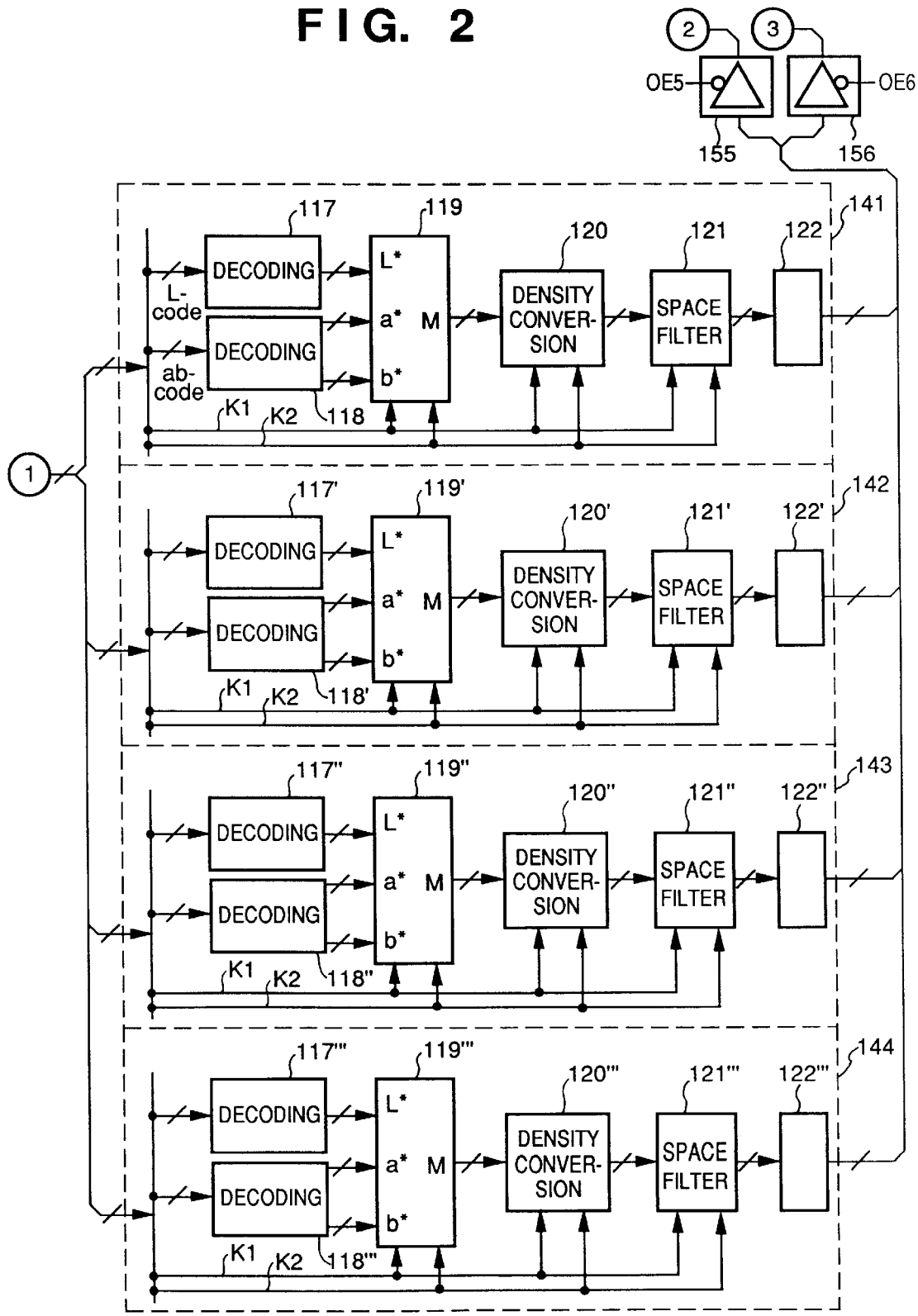

FIGS. 1 and 2 are block diagrams illustrating the configuration of the image processing circuit 212 according to the first embodiment.

The image processing circuit includes CCD sensors 102, 103 for the colors red (R), green (G) and blue (B), respectively, and analog amplifiers 104, 105, 106 that deliver the signals from the CCD sensors as amplified analog signals. The analog outputs of the amplifiers 104, 105, 106 are converted into digital signals by A/D converters 107, 108, 109, respectively. Delay memories 110, 111 correct for a displacement in time among the three CCD sensors 101, 102, 103.

Tri-state gate circuits 151, 152, 153, 154, 155, 156 deliver their inputs only when signals OE1, OE2, OE3, OE4, OE5, OE6, respectively, are logical "0". These signals are set as shown in Table 1, depending upon the contents of zoom processing, by means of a CPU, not shown. Zoom circuits 157, 158, 159, 160 vary the magnification of the image signal in the main-scan direction. Zoom processing in the sub-scan direction is performed by controlling the traveling speed of the mirror unit 210 in FIG. 3.

A color-space converter 112 converts R, G, B signals into a lightness signal L* and chromaticity signals a*, b*. The signals L*, a*, b* are signals that represent chromaticity components stipulated as L*, a*, b* space in accordance with the international standards of the CIE. The signals L*, a*, b* are calculated in accordance with the following equation:

$$\begin{bmatrix} L^* \\ a^* \\ b^* \end{bmatrix} = \begin{bmatrix} 0 & \alpha_{12} & 0 \\ \alpha_{21} & \alpha_{22} & 0 \\ 0 & \alpha_{32} & \alpha_{33} \end{bmatrix} \begin{bmatrix} (X/X_o)^{1/3} \\ (Y/Y_o)^{1/3} \\ (Z/Z_o)^{1/3} \end{bmatrix} + \begin{bmatrix} \alpha_{14} \\ 0 \\ 0 \end{bmatrix} \quad (1)$$

where $\alpha_{ij}$, $X_0$, $Y_0$, $Z_0$ are constants.

In Equation (1), X, Y and Z are signals generated upon being calculated from the R, G, B signals. Specifically, X, Y and Z are calculated in accordance with the following equation:

$$\begin{bmatrix} X \\ Y \\ Z \end{bmatrix} = \begin{bmatrix} \beta_{11} & \beta_{12} & \beta_{13} \\ \beta_{21} & \beta_{22} & \beta_{23} \\ \beta_{31} & \beta_{32} & \beta_{33} \end{bmatrix} \begin{bmatrix} R \\ G \\ B \end{bmatrix} \quad (2)$$

where $\beta_{ij}$ is a constant.

Numeral 113 denotes a coder for the lightness signal. The coder 113 codes the L* signal in units of a 4×4 pixel block to produce a signal L-code, which is the code of the L* signal. Numeral 114 denotes a coder for the chromaticity signals. The coder 114 codes the a*, b* signals in units of a 4×4 pixel block to produce a signal ab-code, which is the code of the a*, b* signals.

A feature extracting circuit 115 comprises a black-pixel detecting circuit 115-1 for generating a decision signal $K_1'$, which indicates whether a pixel of interest is a black pixel or not; a 4×4 area processing circuit 115-11, to which the $K_1'$ signal is applied, for discriminating whether the interior of a 4×4 pixel block is a black-pixel area; a character-area detecting circuit 115-2 for generating a decision signal $K_2'$, which indicates whether the pixel of interest is in a character area or not; and a 4×4 area processing circuit 115-21, to which the $K_2'$ signal is applied, for discriminating whether the interior of a 4×4 pixel block is a character area.

The black-pixel detecting circuit 115-1 will now be described in greater detail.

Upon receiving the R, G, B data applied thereto, the circuit 115-1 calculates the maximum value max(R,G,B) and minimum value min(R,G,B) of this data. When the calculated results satisfy the following inequalities, the circuit 115-1 outputs the signal $K_1'$ (a signal of logical level "1") indicating that the pixel of interest is black:

max(R,G,B)−min(R,G,B)<TH0
max(R,G,B)<TH1 where TH0, TH1 are predetermined values.

More specifically, a pixel for which the luminance components are substantially the same (achromatic) and, moreover, the luminance level is low is judged to be a black pixel.

The character-area detecting circuit 115-2 refers solely to the G component applied thereto and outputs the signal $K_2'$, which indicates whether or not the pixel of interest is in a character area or line-drawing area (i.e., whether or not the pixel of interest resides on the edge of a character or line drawing).

As for the criteria used in making this judgment, the pixel of interest is construed to reside on the edge of a character or line drawing, and the signal $K_2'$="1" is outputted, if the following two conditions are satisfied: (1) the luminance of the pixel of interest is low and the luminance of pixels neighboring the pixel of interest is greater than a fixed value, and (2) the condition (1) is continuous for more than several pixels in a direction at right angles to the direction in which luminance undergoes a large change. For example, if the luminance of the pixel of interest is low and the luminance of the pixel neighboring this pixel on the left is high, it is determined whether the pixels above and below the pixel of interest have a similar relationship relative to the pixel of interest. Then, if the pixels above and below the pixel of interest satisfy this condition, it is judged that the pixel of interest is part of a vertical line. The level of the signal $K_2'$ is made "1" as a result.

The black-pixel detecting circuits 115-1, 115-2 are well-known in the art and therefore a description beyond that given above is omitted. Generally, in the field of image processing, techniques for judging whether a pixel of interest is a black pixel and for judging whether a pixel of interest resides on a character or line drawing are used frequently in area discrimination, and the present invention is not limited by the above-described example.

Numeral 116 denotes an image memory for storing the signal L-code, which is the code of lightness information, the signal ab-code, which is the code of chromaticity information, and the decision signals K1, K2, which are the results of feature extraction.

Numerals 141, 142, 143, 144 denote density-signal generating means for magenta (M), cyan (C), yellow (Y) and black (Bk), respectively. These are substantially the same in terms of construction.

Numeral 117 (and numerals 117', 117", 117''' likewise) denotes a decoder for the lightness information. The decoder 117 decodes the L* signal by the signal L-code read out of the image memory 116.

Numeral 118 (and numerals 118', 118", 118''' likewise) denotes a decoder for the chromaticity information. The decoder 118 decodes the a* signal and b* signal by the signal ab-code read out of the image memory 116.

Numeral 119 denotes a color-space converter for converting the decoded L*, a*, b* signals into a magenta (M) color component, which is one of the colors developed by toner. Similarly, color space converters 119', 119", 119''' convert the decoded L*, a*, b* signals into cyan (C), yellow (Y) and (Bk) color-component data, respectively.

Numeral 120 (and numerals 120', 120", 120''' likewise) denotes density converting means constituted by a ROM or RAM look-up table. Numeral 121 (and numerals 121', 121", 121''' likewise) denotes a space filter for applying a correction to the spatial frequency of the output image. Numeral 122 (and numerals 122', 122", 122''' likewise) denotes a pixel correcting circuit for correcting the image data that has been decoded.

TABLE 1

|  | ENLARGEMENT PROCESSING (FIRST MODE) | REDUCTION PROCESSING (SECOND MODE) |
| --- | --- | --- |
| OE1 | 0 | 1 |
| OE2 | 1 | 0 |
| OE3 | 0 | 1 |
| OE4 | 1 | 0 |
| OE5 | 1 | 0 |
| OE6 | 0 | 1 |

[Enlargement processing]

In a first mode for performing enlargement processing, zoom processing is executed prior to coding (data compression). To this end, the three signals OE1, OE3, OE6 are each set to "0" and the three signals OE2, OE4, OE5 are each set to "1", as shown in Table 1, so that only the tri-state gates 151, 153, 156 are enabled while the tri-state gates 152, 154, 155 are disabled. As a result, the R/G/B input image signals synchronized by the delay elements 110, 111 first are subjected to enlargement processing by the zoom circuits 157, 158, 159 via the tri-state gate 151. The detailed operation of the zoom circuits is well-known from the specification of Japanese Patent Application No. 1-199344 and need not be described here.

Next, the R/G/B image signals thus subjected to enlargement processing are sent to the color-space converter 112 and feature extracting circuit 115 via the tri-state gate 153. The image code signals L-code and ab-code that have been coded via the respective coders 113, 114, as well as the feature signals $K_1$, $K_2$ extracted by the feature extracting circuit 115, are applied to and stored in the image memory 116.

Codes that have been read out of the memory 116 are decoded (decompressed) as density image signals by the density-information decoders for magenta (M), cyan (C), yellow (Y) and black (Bk), and the decoded signals are sent to magenta (M), cyan (C), yellow (Y) and black (Bk) laser drivers, respectively, via the tri-state gate 156.

[Reduction processing]

In a second mode for performing reduction processing, zoom processing is executed prior to coding (data compression). To this end, the three signals OE2, OE4, OE5 are each set to "0" and the three signals OE1, OE3, OE6 are each set to 11111, as shown in Table 1, so that only the tri-state gates 152, 154, 155 are enabled while the tri-state gates 151, 153, 156 are disabled. As a result, the R/G/B input image signals synchronized by the delay elements 110, 111 first are sent to the color-space converter 112 and feature extracting circuit 115 via the tri-state gate 152. The image code signals L-code and ab-code that have been coded via the respective coders 113, 114, as well as the feature signals $K_1$, $K_2$ extracted by the feature extracting circuit 115, are applied to and stored in the image memory 116.

Codes that have been read out of the memory 116 are decoded (decompressed) as density image signals by the density-information decoders for magenta (M), cyan (C), yellow (Y) and black (Bk), after which the decoded signals are subject to reduction processing by the zoom processing circuits 157, 158, 159, 160 via the tri-state 155. Here also the detailed operation of the zoom circuits is well-known from the specification of Japanese Patent Application No. 1-199344 and need not be described.

The signals that have been subjected to reduction processing are sent to magenta (M), cyan (C), yellow (Y) and black (Bk) laser drivers, respectively, via the tri-state gate 154.

Figure 4:
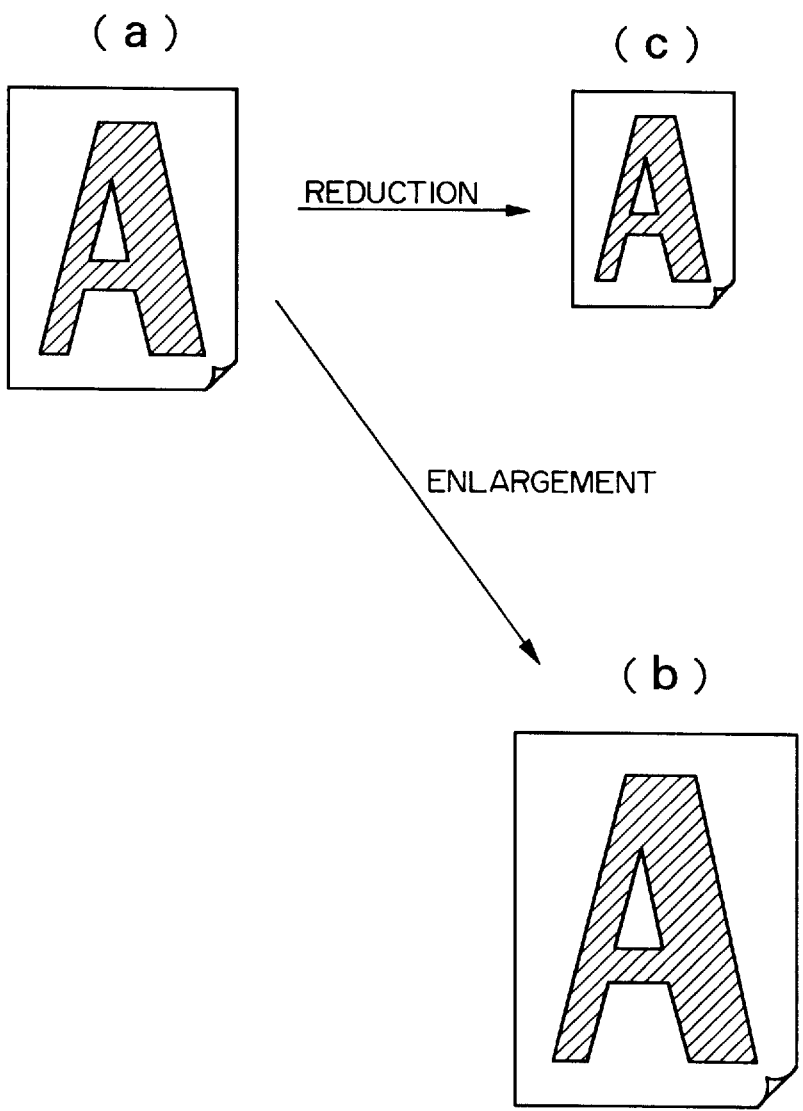
FIG. 4 is a diagram showing an example enlargement/reduction processing.

The result of enlargement processing applied to the image shown in FIG. 4 with a code (a) in the first mode is illustrated in FIG. 4 with a code (b), and the result of reduction processing applied to the image shown in FIG. 4 with a code (a) in the second mode is illustrated in FIG. 4 with a code (c).

[Coder 113 for lightness component}

Figure 13:
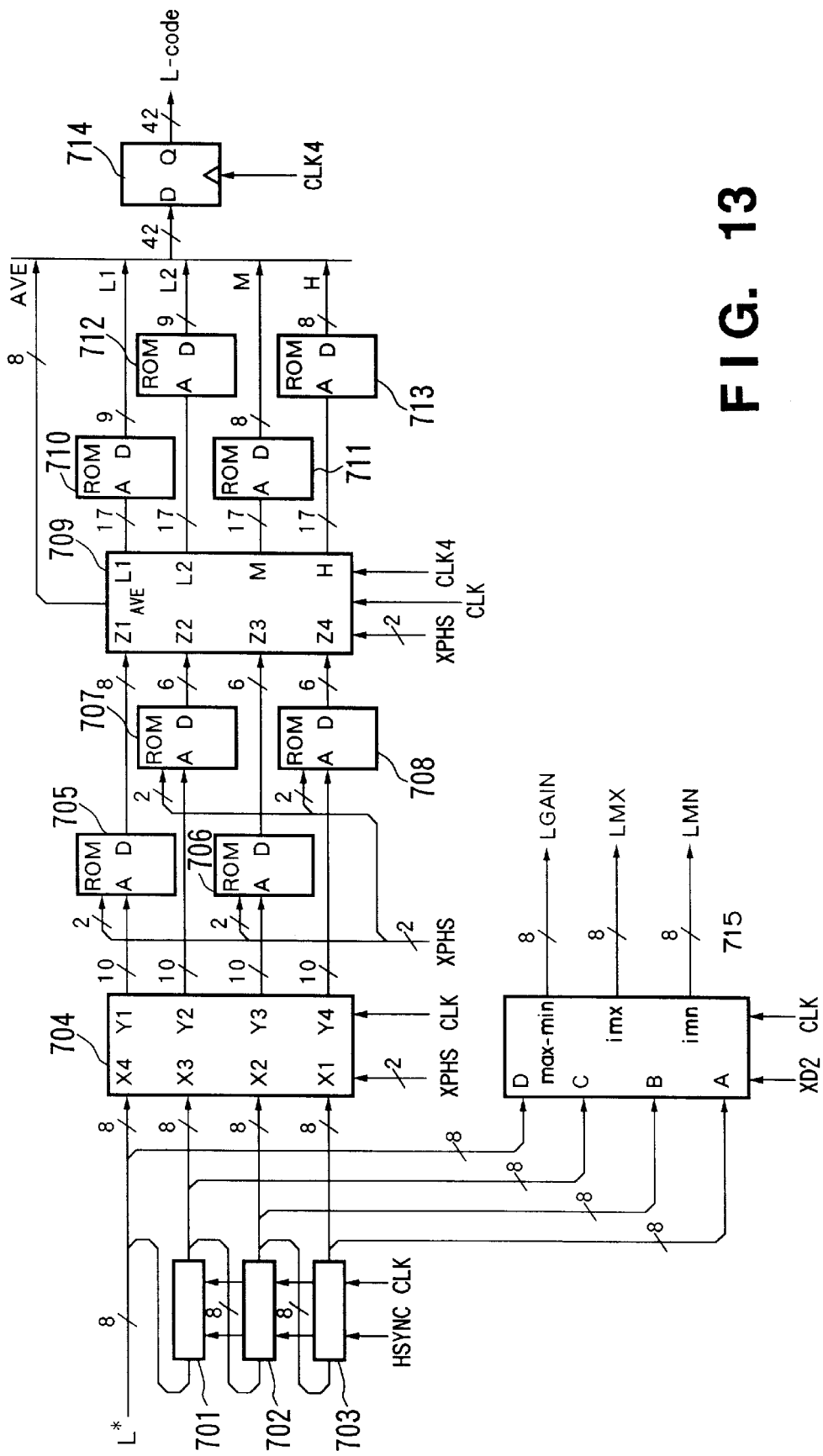
FIG. 13 is a block diagram showing a lightness-information coder in FIG. 1.
Figure 14:
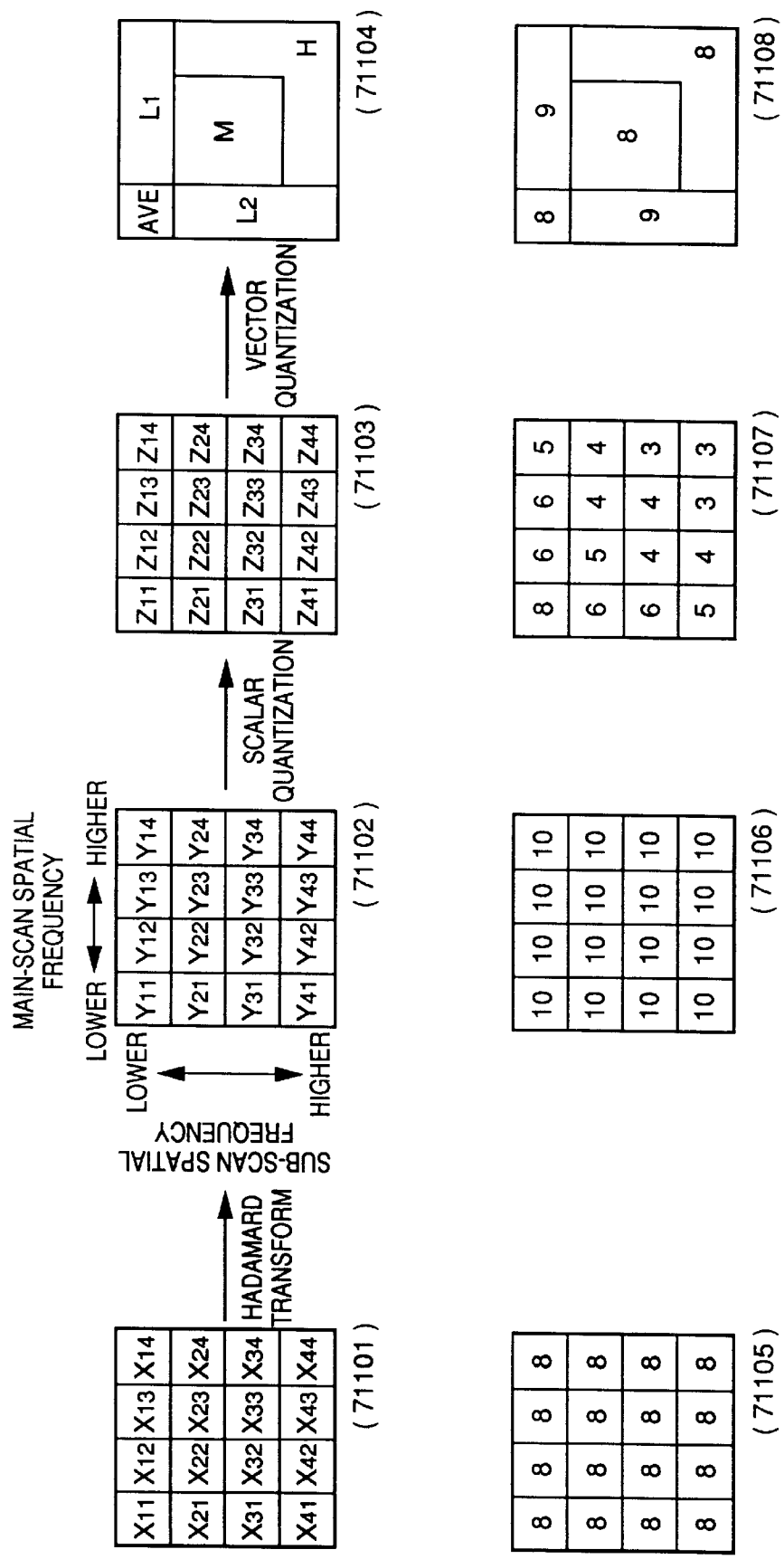
FIG. 14 is a conceptual view of lightness-information coding processing.
Figure 34:
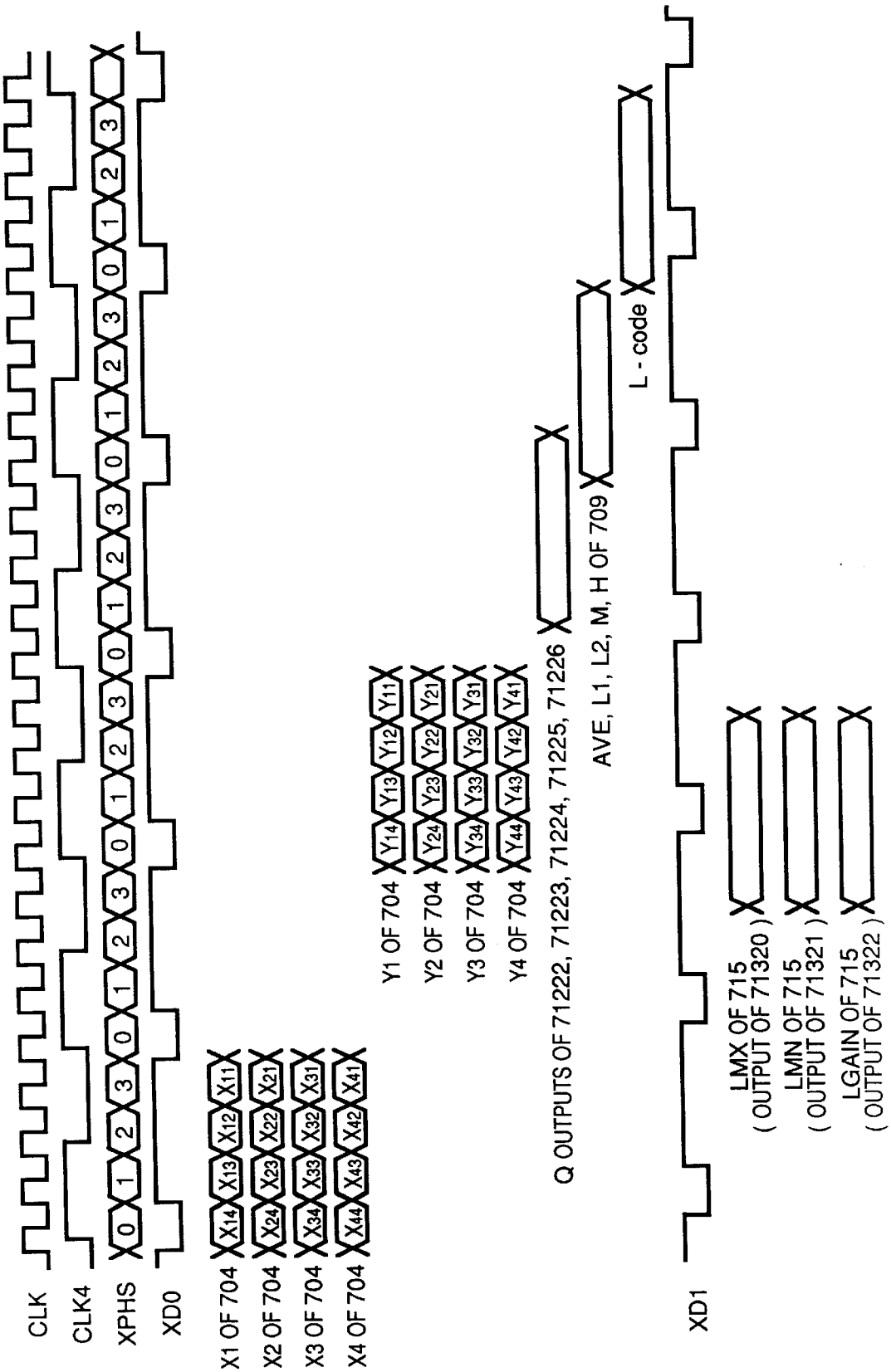
FIG. 34 is a timing chart associated with a coder 113 of FIG. 1.

FIG. 13 is a block diagram showing the lightness-information coder 113, and FIG. 34 is a timing chart associated with the coder 113. FIG. 14 is a conceptual view showing lightness-information coding processing. The coding (compression) of the image data is carried out in units of a 16-pixel block, namely a block of 4 pixels (main scan)×4 pixels (subordinate scan), shown in FIG. 26. In FIG. 26, XPHS denotes a two-bit signal indicating main-scan position. This signal is outputted as values of 0, 1, 2, 3 in repetitive fashion. Further, YPHS denotes a two-bit signal indicating sub-scan position. This signal also is outputted as values of 0, 1, 2, 3 in repetitive fashion. As illustrated in FIG. 13, a 4×4 pixel block is clipped from the image data in synchronism with the signals XPHS, YPHS.

The concept of coding of the lightness information will be described with reference to FIG. 14. Let the lightness information that has been subdivided into the 4×4 pixel block be represented by $X_{ij}$ (i, j=1, 2, 3, 4), as illustrated at 71101. A 4×4 Hadamard transform indicated by Equation (3) below is applied to this lightness information to obtain $Y_{ij}$ (i, j=1, 2, 3, 4) illustrated at 71102. A Hadamard transform is one type of orthogonal transformation through which 4×4 data is expanded in the form of a two-dimensional Walsh function and is equivalent to transforming a time-area or space-area signal into a frequency area or spatial-frequency area by a Fourier transform. That is, the matrix Y (i,j=1, 2, 3, 4) that results from a Hadamard transformation is a signal corresponding to each component of a spatial frequency possessed by the matrix $X_{ij}$ (i,j=1, 2, 3, 4) of the input signal.

$$\begin{bmatrix} Y_{11}Y_{12}Y_{13}Y_{14} \\ Y_{21}Y_{22}Y_{23}Y_{24} \\ Y_{31}Y_{32}Y_{33}Y_{34} \\ Y_{41}Y_{42}Y_{43}Y_{44} \end{bmatrix} = (1/4) \cdot H^T \cdot \begin{bmatrix} X_{11}X_{12}X_{13}X_{14} \\ X_{21}X_{22}X_{23}X_{24} \\ X_{31}X_{32}X_{33}X_{34} \\ X_{41}X_{42}X_{43}X_{44} \end{bmatrix} \cdot H \quad (3)$$

where H is a 4×4 Hadamard matrix shown below $$H = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

and $H^T$ represents the transposed matrix of H.

As in the case of a two-dimensional Fourier transform, the larger the value of i (namely the row position) in the output $Y_{ij}$ (i,j=1, 2, 3, 4) of the Hadamard transform, the higher the spatial frequency component in the sub-scan direction, just as in the case of a two-dimensional Fourier transform. Similarly, the larger the value of j (namely the column position) in the output $Y_{ij}$ (i,j=1, 2, 3, 4) of the Hadamard transform, the higher the spatial frequency component in the main-scan direction. In particular, in a case where i=j=1 holds, $Y_{ij}=(\frac{1}{4})\Sigma X_{ij}$ will hold and the DC component of the input data $X_{ij}$ (i,j=1, 2, 3, 4), namely a signal corresponding to the average value (strictly speaking, a signal indicative of a value that is four times the average value) will be outputted.

Furthermore, in general it is not often that an image that has been read in possesses only high spatial-frequency components, though this depends upon the reading resolution of the reading sensor, such as a CCD, and the transmission characteristic of the optical system. By utilizing this fact, the signal $Y_{ij}$ (i,j=1, 2, 3, 4) 71102 resulting from the Hadamard transformation is subjected to scalar quantization to obtain $X_{ij}$ (i,j =1, 2, 3, 4). In FIG. 14, 71105 illustrates the number of bits of each element of $X_{ij}$ (i,j=1, 2, 3, 4) 71101; 71106 illustrates the number of bits of each element of $Y_{ij}$ (i,j=1, 2, 3, 4) 71102; and 71107 illustrates the number of bits of each element of $Z_{ij}$ (i,j=1, 2, 3, 4) 71103. As illustrated, $Y_{ij}$, namely the DC component, is quantized to eight bits, which is the largest number of bits, to obtain $Z_{ij}$. The higher the spatial frequency, the smaller the number of bits to which each $Y_{ij}$ is quantized. Furthermore, the 16 pixels of $Z_{ij}$ (i,j=1, 2, 3, 4) 71103 are grouped into one DC component AVE and four AC components $L_1$, $L_2$, M, H. As shown in Table 2 below, $Z_{11}$ is assigned to AVE as the DC component, $Z_{12}$, $Z_{13}$, $Z_{14}$ are grouped and assigned to L1 as main-scan AC components, $Z_{21}$, $Z_{31}$, $Z_{41}$ are grouped and assigned to L2 as sub-scan AC components, $Z_{22}$, $Z_{23}$, $Z_{32}$, $Z_{33}$ are grouped and assigned to M as main-scan and sub-scan intermediate AC components, and $Z_{24}$, $Z_{34}$, $Z_{42}$, $Z_{43}$, $Z_{44}$ are grouped and assigned to H as main-scan and sub-scan higher AC components.

TABLE 2

| AVE | EQUIVALENT TO DC COMPONENT (AVERAGE VALUE) | Z11 |
|---|---|---|
| L1 | MAIN-SCAN AC COMPONENTS | Z12, Z13, Z14 |
| L2 | SUB-SCAN AC COMPONENTS | Z21, Z31, Z41 |
| M | MAIN- AND SUB-SCAN MID-FREQUENCY AC COMPONENTS | Z22, Z23, Z32 Z33 |
| H | MAIN- AND SUB-SCAN HIGH-FREQUENCY AC COMPONENTS | Z24, Z34, Z42, Z43, Z44 |

As shown in FIG. 13, numerals 701, 702, 703 denote line memories each for delaying the image data by one line, whereby the image block shown in FIG. 26 is clipped from the image data. A Hadamard transformation circuit 704 performs the transform indicated by Equation (3). More specifically, as illustrated in FIG. 34, signals $X_{11}$, $X_{12}$, $X_{13}$, $X_{14}$; signals $X_{21}$, $X_{22}$, $X_{23}$, $X_{24}$; signals $X_{31}$, $X_{32}$, $X_{33}$, $X_{34}$; and signals $X_{41}$, $X_{42}$, $X_{43}$, $X_{44}$ enter X1, X2, X3 and X4, respectively, of the Hadamard transformation circuit 704, in synchronization with signals CLK and XPHS, and signals resulting from the Hadamard transformation, namely $Y_{11}$, $Y_{12}$, $Y_{13}$, $Y_{14}$; $Y_{21}$, $Y_{22}$, $Y_{23}$, $Y_{24}$; $Y_{31}$, $Y_{32}$, $Y_{33}$, $Y_{34}$; and $Y_{41}$, $Y_{42}$, $Y_{43}$, $Y_{44}$ are outputted from $Y_1$, $Y_2$, $Y_3$ and $Y_4$, respectively, of the Hadamard transformation circuit 704 upon a delay of eight pulses of the signal CLK. Look-up table ROM's 705, 706, 707, 708 perform the scalar quantization described in connection with FIG. 14. That is, in order for outputs resulting from the Hadamard transformation to be quantized to the numbers of bits indicated at 71107 in FIG. 14, these transformed outputs and the signal XPHS are applied to the addresses of each of the ROM's 705, 706, 707, 708, and data is written into each ROM in advance in such a manner that scalar-quantized results will be delivered as the outputs.

Figure 15:
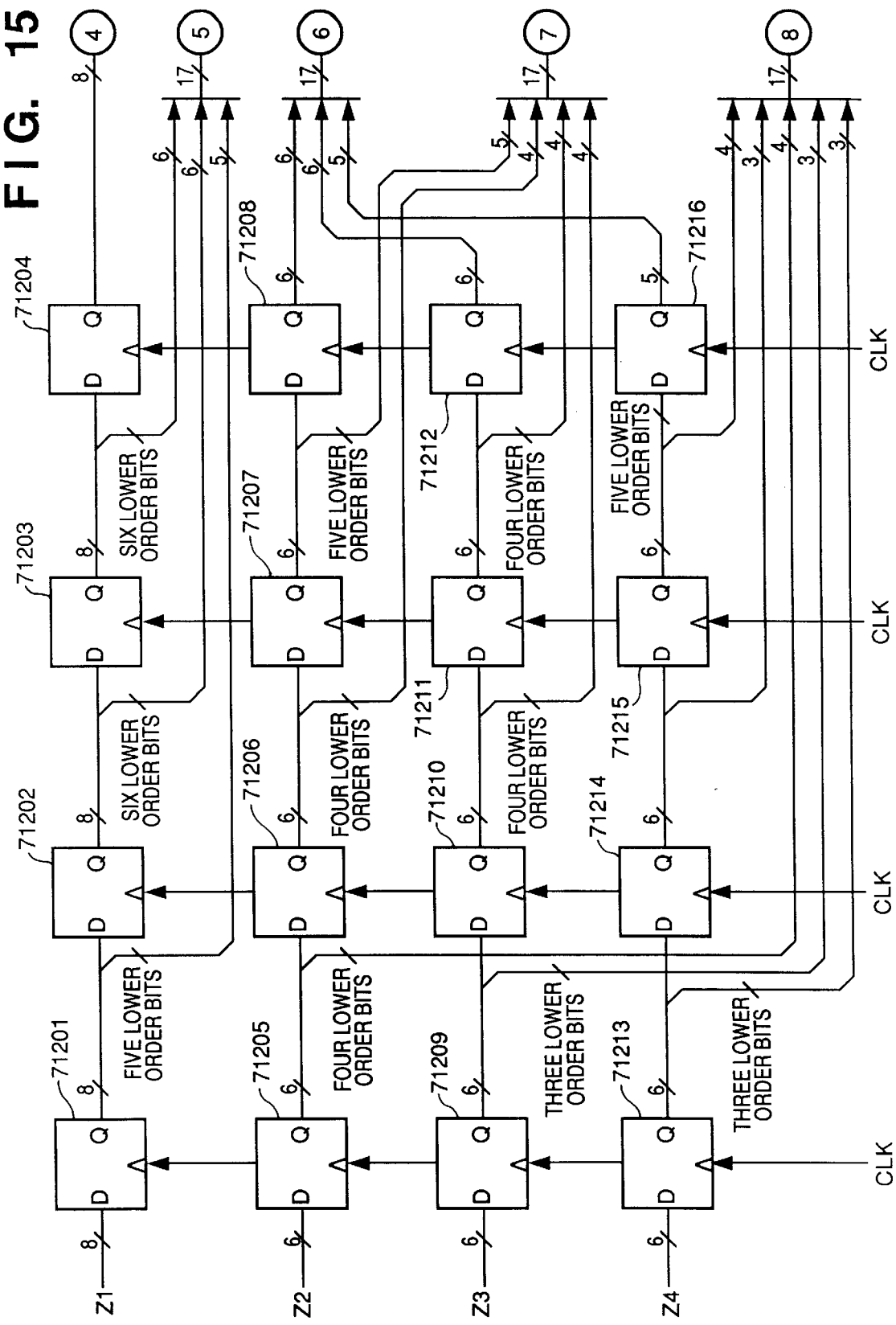
FIGS. 15 and 16 are block diagrams showing a circuit 709 in FIG. 13
Figure 16:
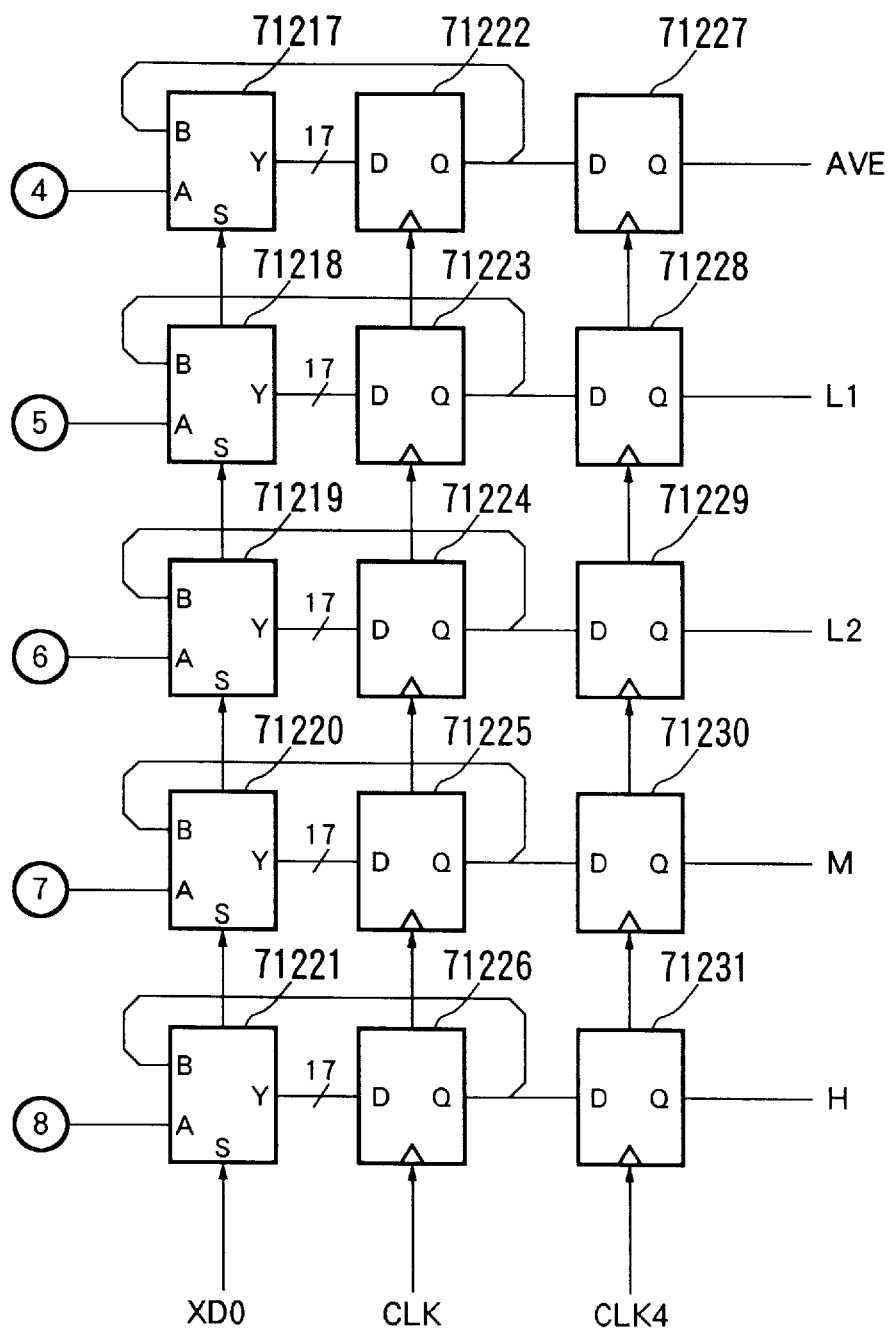

Numeral 709 denotes a circuit that executes grouping for the purpose of vector quantization. FIGS. 15 and 16 detailed block diagrams of this circuit.

In FIGS. 15 and 16, numerals 71201, 71202, 71203, 71204, 71205, 71206, 71207, 71208, 71209, 71210, 71211, 71212, 71213, 71214, 71215 and 71216 denote flip-flops for applying a delay synchronized to the CLK signal, holding each item of data in the 4×4 block shown at 71103 in FIG. 14 and extracting the data of each of the groupings AVE, L1, L2, M, H indicated at 71104 and Table 2. Numerals 71217, 71218, 71219, 71220, 71221 denote 2-to-1 selectors each of which delivers the value of its A input from its Y output if "0" is inputted to the S terminal and the value of its B input from its Y output if "1" is inputted to the S terminal.

Flip-flops 71222, 71223, 71224, 71225, 71226 apply a delay synchronized to the CLK signal. As shown in FIG. 34, a signal XDO is synchronized to the CLK signal and XPHS signal and becomes "0" only when the XPHS signal is "0"; at all other times, the XDO signal is "1". As a result, the outputs of the selectors 71217, 71218, 71219, 71220, 71221 are delayed by one pulse of the CLK signal by means of the flip-flops 71222, 71223, 71224, 71225, 71226 so that the results of scalar quantization of each group shown in Table 2 are outputted from the Q outputs of these flip-flops, at the timing shown in FIG. 34, every 4×4 block. Furthermore, flip-flops 71227, 71228, 71229, 71230, 71231 hold the input data at the leading edge of a signal CLK4 and output the signals AVE, L1, L2, M, H, respectively, at the timing shown in FIG. 34.

In FIG. 13, look-up table ROM's 710, 711, 712, 713 employ well-known vector quantization to quantize the signals outputted from L1, L2, M, H, respectively, of the circuit 709. The look-up table ROM's 710, 711, 712, 713 respectively quantize the group of L1 to nine bits, the group of L2 to nine bits, the group of M to eight bits and the group of H to eight bits. A flip-flop 714 synchronizes AVE, L1, L2, M, H to the leading edge of the signal CLK4 and delivers these signals as L-code at the timing illustrated in FIG. 34.

Numeral 715 in FIG. 13 denotes an LGAIN calculating unit having input terminals A, B, C, D to which the L* signal is applied in 4×4 block units at timings similar to those of the inputs X1, X2, X3, X4 of the circuit 704. The calculating unit 715 calculates an LGAIN signal, which is the amplitude (maximum value—minimum value) of the lightness signal L* in a 4×4 block, an LMX signal indicative of position (coordinates within the 4×4 pixel block) in a case where L* is a maximum value, and an LMN signal indicative of position (coordinates within the 4×4 pixel block) in a case where L* is a minimum value.

Figure 17:
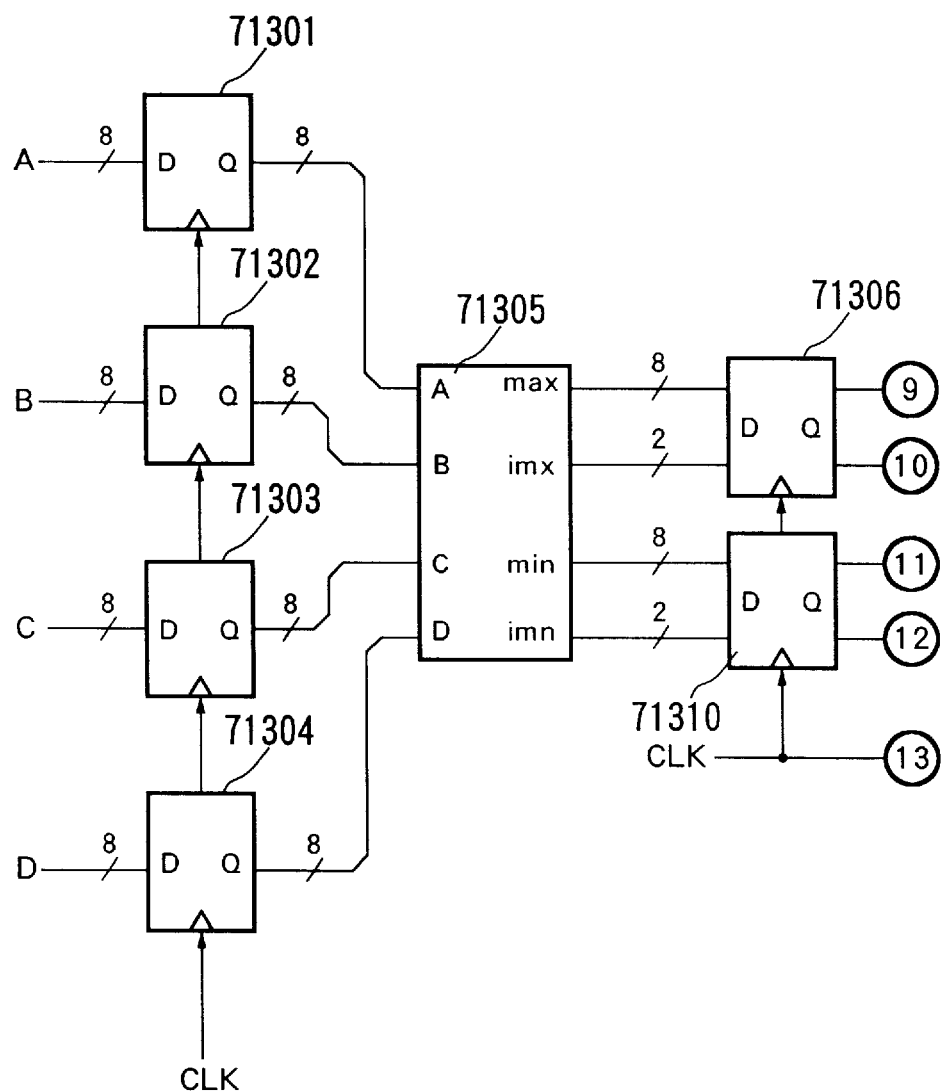
FIGS. 17 and 18 are block diagrams showing a circuit 715 in FIG. 13.
Figure 18:
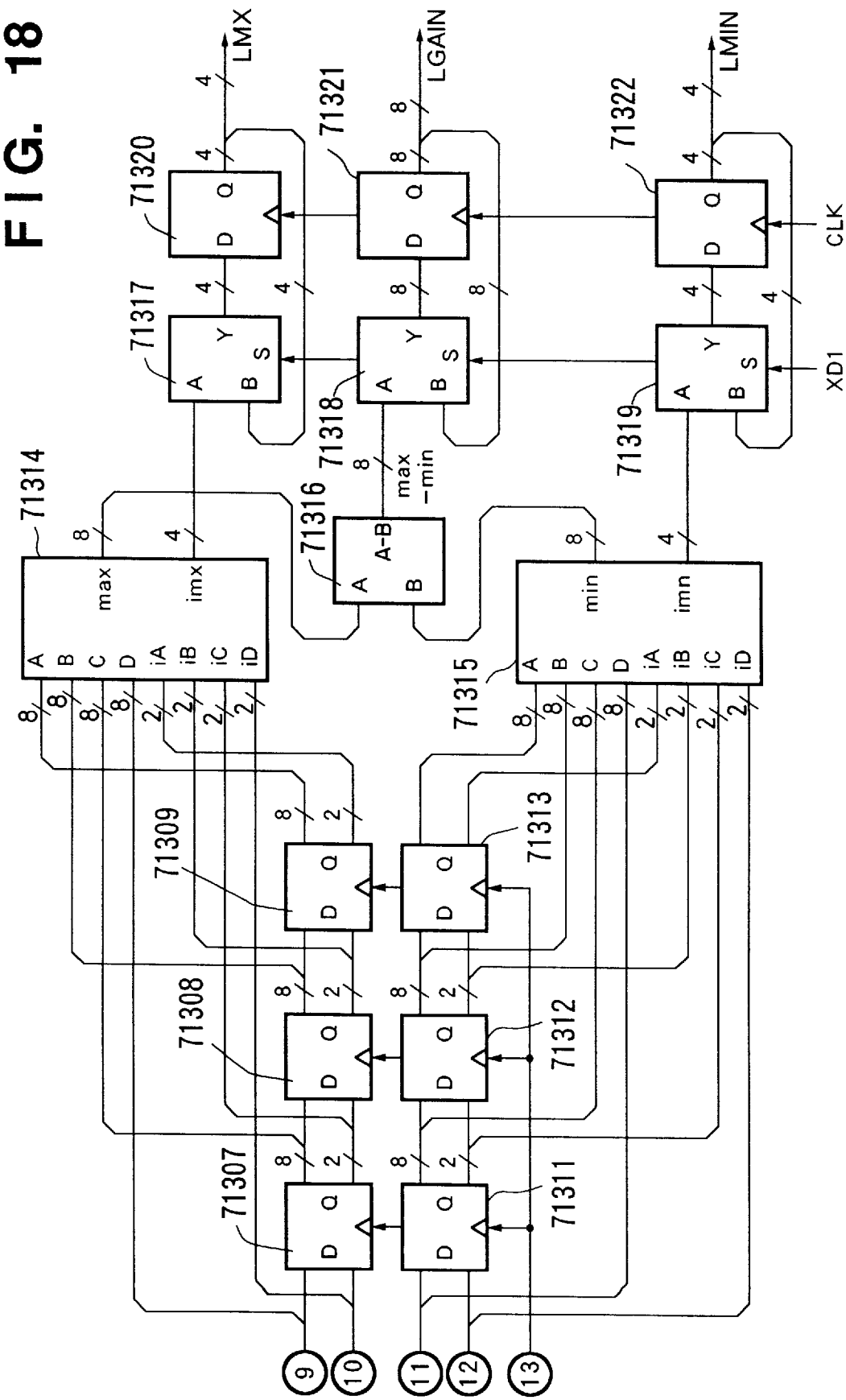
Figure 19:
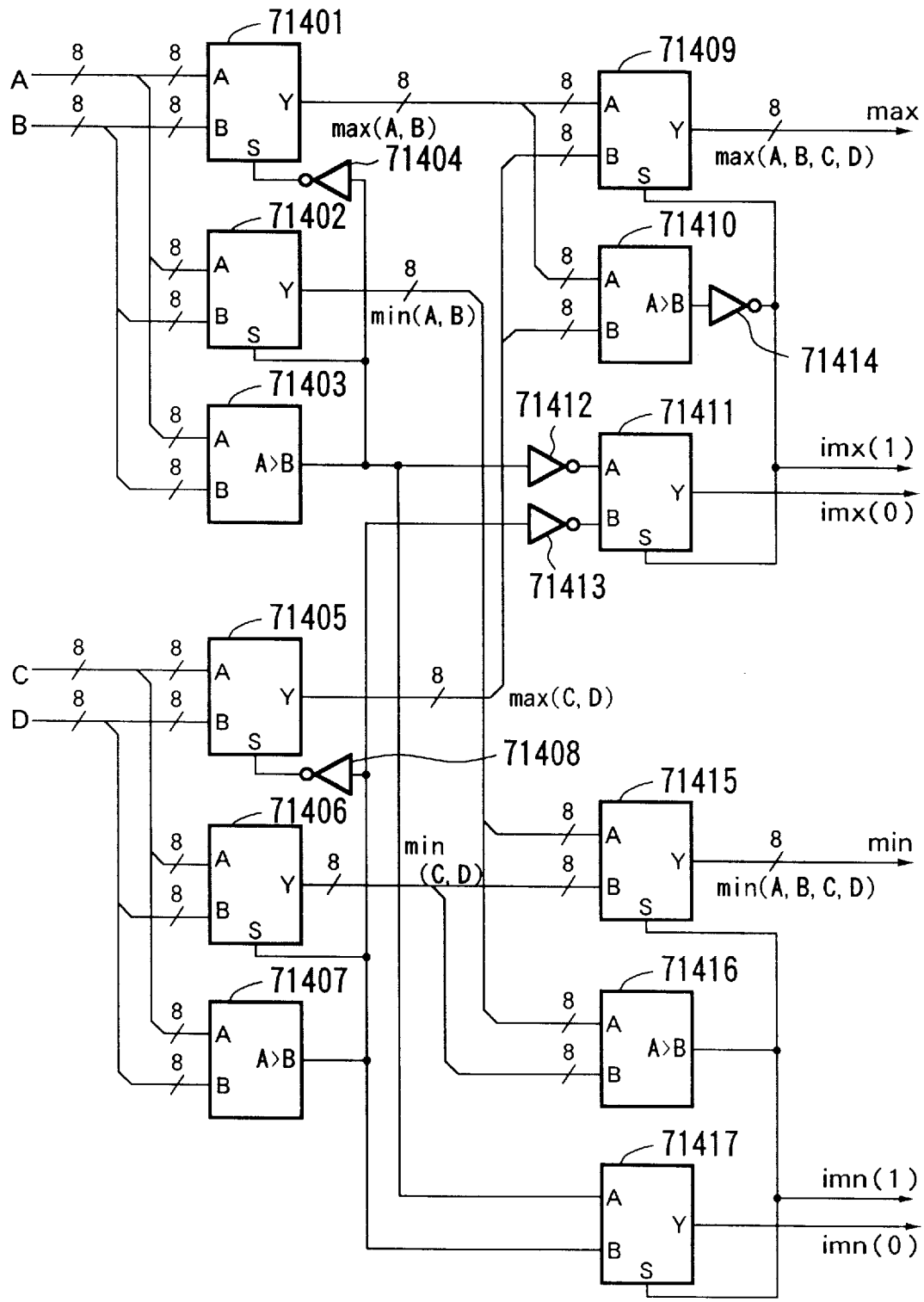
FIG. 19 is a block diagram showing a maximum-value/minimum-value detecting circuit in FIG. 17.

FIGS. 17 and 18 are block diagrams illustrating the LGAIN calculating unit 715. The calculating unit 715 includes flip-flops 71301, 71302, 71303, 71304, which hold the input data at the leading edge of the CLK signal, and a maximum-value/minimum-value retrieving circuit 71305 for retrieving maximum and minimum values in the sub-scan direction. FIG. 19 illustrates the details of the retrieving circuit 71305.

As shown in FIG. 19, the retrieving circuit 71305 includes 2-to-1 selectors 71401, 71402, a comparator 71403 and an inverter 71404. If A>B holds, an output Y of the comparator 71403 goes to logical "1", a Y output of the selector 71401 delivers an A signal and a Y output of the selector 71402 delivers a B signal. If A≦B holds, on the other hand, the output Y of the comparator 71403 goes to logical "0", the Y output of the selector 71401 delivers the B signal and the Y output of the selector 71402 delivers the A signal. As a result, the Y output of the selector 71401 delivers the value of max(A,B), and the Y output of the selector 71402 delivers the value of min(A,B).

The retrieving circuit 71305 further includes 2-to-1 selectors 71405, 71406, a comparator 71407 and an inverter 71408. If C>D holds, an output Y of the comparator 71407 goes to logical "1", a Y output of the selector 71405 delivers a C signal and a Y output of the selector 71406 delivers a D signal. If C≦D holds, on the other hand, the Y output of the comparator 71407 goes to logical "0", the Y output of the selector 71405 delivers the D signal and the Y output of the selector 71406 delivers the C signal. As a result, the Y output of the selector 71405 delivers the value of max(C,D), and the Y output of the selector 71406 delivers the value of min(C, D).

The retrieving circuit 71305 further includes 2-to-1 selectors 71409, 71411, a comparator 71410 and inverters 71412, 71413, 71414. If max(A,B)>max(C,D) holds, an output of the comparator 71410 goes to logical "1" and the value of max(A,B) is delivered from the Y output of the selector 71409. If max(A,B)≦max(C,D) holds, on the other hand, the output of the comparator 71410 goes to logical "0" and the value of max(C,D) is delivered from the Y output of the selector 71409. As a result, the value of max(A,B,C,D) is delivered as max from the Y output of the selector 71409. Furthermore, codes indicating which of the signals A, B, C, D has taken on the maximum value are outputted at imn(0), imn(1) in the following manner: Specifically, imn(1)=0 and imn(0)=0 are established when A takes on the maximum value;

imn(1)=0 and imn(0)=1 are established when B takes on the maximum value;

imn(1)=1 and imn(0)=0 are established when C takes on the maximum value; and imn(1)=1 and imn(0)=1 are established when D takes on the maximum value.

The retrieving circuit 71305 further includes 2-to-1 selectors 71415, 71417 and a comparator 71416. If min(A,B)>min(C,D) holds, an output of the comparator 71416 goes to logical "1" and the value of min(C,D) is delivered from the Y output of the selector 71415. If min(A,B)≦min(C,D) holds, on the other hand, the output of the comparator 71416 goes to logical "0" and the value of min(A,B) is delivered from the Y output of the selector 71415. As a result, the value of min(A,B,C,D) is delivered as min from the Y output of the selector 71415. Furthermore, codes indicating which of the signals A, B, C, D has taken on the minimum value are outputted at imn(0), imn(1) in the following manner: Specifically, imn(1)=0 and imn(0)=0 are established when A takes on the minimum value;

imn(1)=0 and imn(0)=1 are established when B takes on the minimum value;

imn(1)=1 and imn(0)=0 are established when C takes on the minimum value; and imn(1)=1 and imn(0)=1 are established when D takes on the minimum value.

In FIGS. 17 and 18, flip-flops 71306, 71307, 71308, 71309, 71310, 71311, 71312, 71313 that apply a delay equivalent to one pulse of the CLK signal to each of the output signals max, min, imx, imn from the circuit 71305 that retrieves the maximum and minimum values in the sub-scan direction. Numeral 71314 denotes a circuit for retrieving the maximum value in the main-scan direction. The details of this circuit are illustrated in FIG. 20.

Figure 20:
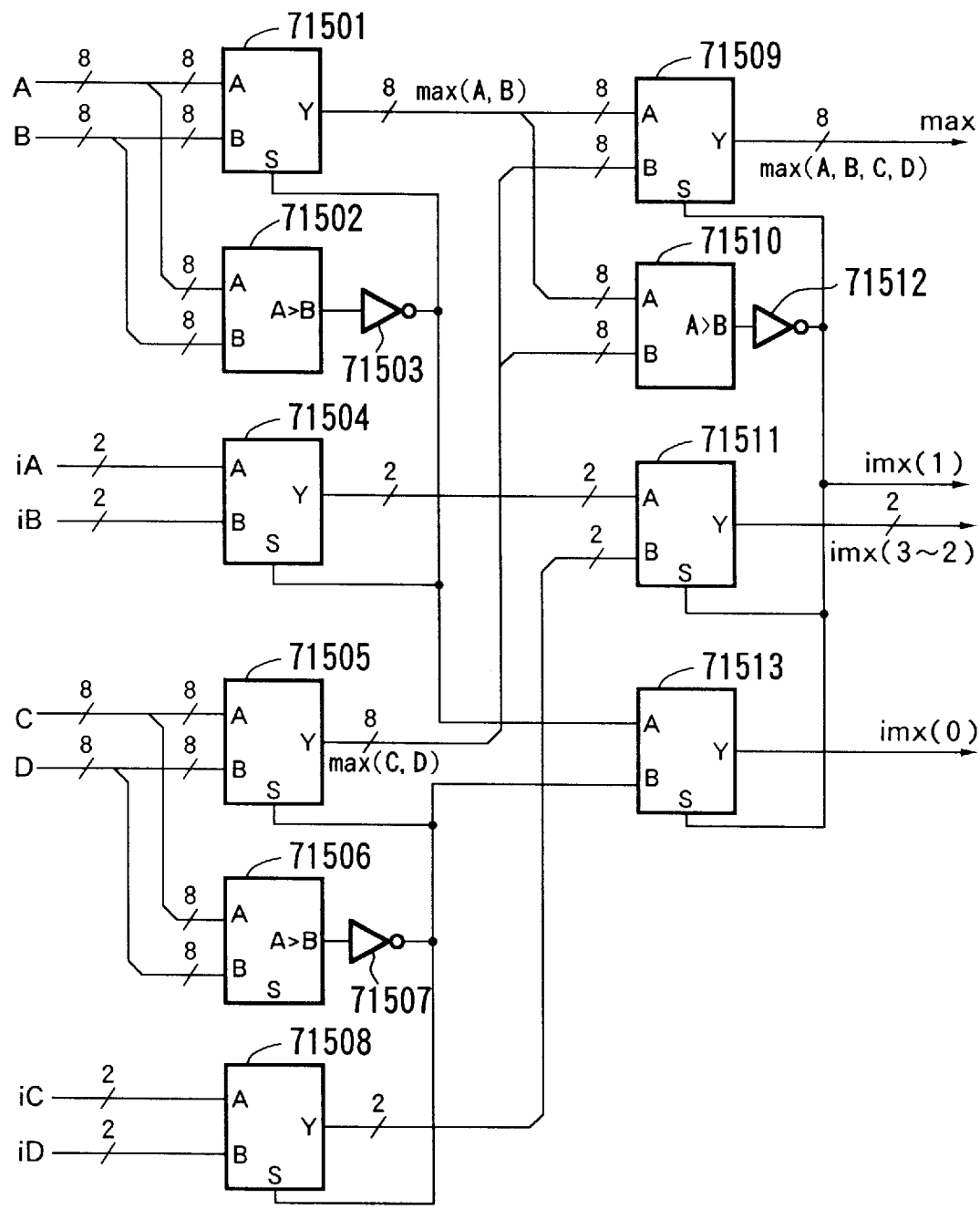
FIG. 20 is a block diagram showing a circuit 71314 for retrieving maximum value in a main-scan direction in FIG. 18.

As shown in FIG. 20, the circuit 71314 includes a 2-to-1 selector 71501, a comparator 71502 and an inverter 71503. If A>B holds, the output of the comparator 71502 goes to logical "1" and the A signal appears at the Y output of the selector 71501. If A≦B holds, on the other hand, the output of the comparator 71502 goes to logical "0" and the B signal appears at the Y output of the selector 71501. As a result, the value of max(A,B) appears at the Y output of the selector 71501. Similarly, iA is delivered from the Y output of a selector 71504 if A>B holds, and iB is delivered from the Y output of the selector 71504 if A≦B holds.

The circuit 71314 further includes a 2-to-1 selector 71505, a comparator 71506 and an inverter 71507. If C>D holds, the output of the comparator 71506 goes to logical "1" and the C signal appears at the Y output of the selector 71505. If C≦D holds, on the other hand, the output of the comparator 71506 goes to logical "0" and the D signal appears at the Y output of the selector 71505. As a result, the value of max(C,D) appears at the Y output of the selector 71505. Similarly, iC is delivered from the Y output of a selector 71508 if C>D holds, and iD is delivered from the Y output of the selector 71508 if C≦D holds.

The circuit 71314 further includes a 2-to-1 selector 71509, a comparator 71510, a 2-to-1 selector 71511, an inverter 71512 and a 2-to-1 selector 71513. If max(A,B)>max(C,D) holds, the output of the comparator 71510 goes to logical "1" and max(A,B) appears at the Y output of the selector 71509. If max(A,B)≦max(C,D) holds, the output of the comparator 71510 goes to logical "0" and max(C,D) appears at the Y output of the selector 71509. As a result, the value of max(A,B,C,D) appears at the Y output of the selector 71509.

Further, as a result of the foregoing, the value of imx is decided as follows depending upon which of the inputs of A, B, C, D takes on the maximum value:
Specifically, imx(3~2)=iA, imx(1)=0, imx(0)=0 are established when A takes on the maximum value;

imx(3~2)=iB, imx(1)=0, imx(0)=0 are established when B takes on the maximum value;

imx(3~2)=iC, imx(1)=0, imx(0)=0 are established when C takes on the maximum value; and imx(3~2)=iD, imx(1)=0, imx(0)=0 are established when D takes on the maximum value. Here imx is a signal indicating the position (coordinates) at which the L* signal takes on the maximum value in the 4×4 pixel block.

In FIGS. 17 and 18, numeral 71315 denotes a circuit for retrieving the minimum value in the main-scan direction. The details of this circuit are illustrated in FIG. 21.

Figure 21:
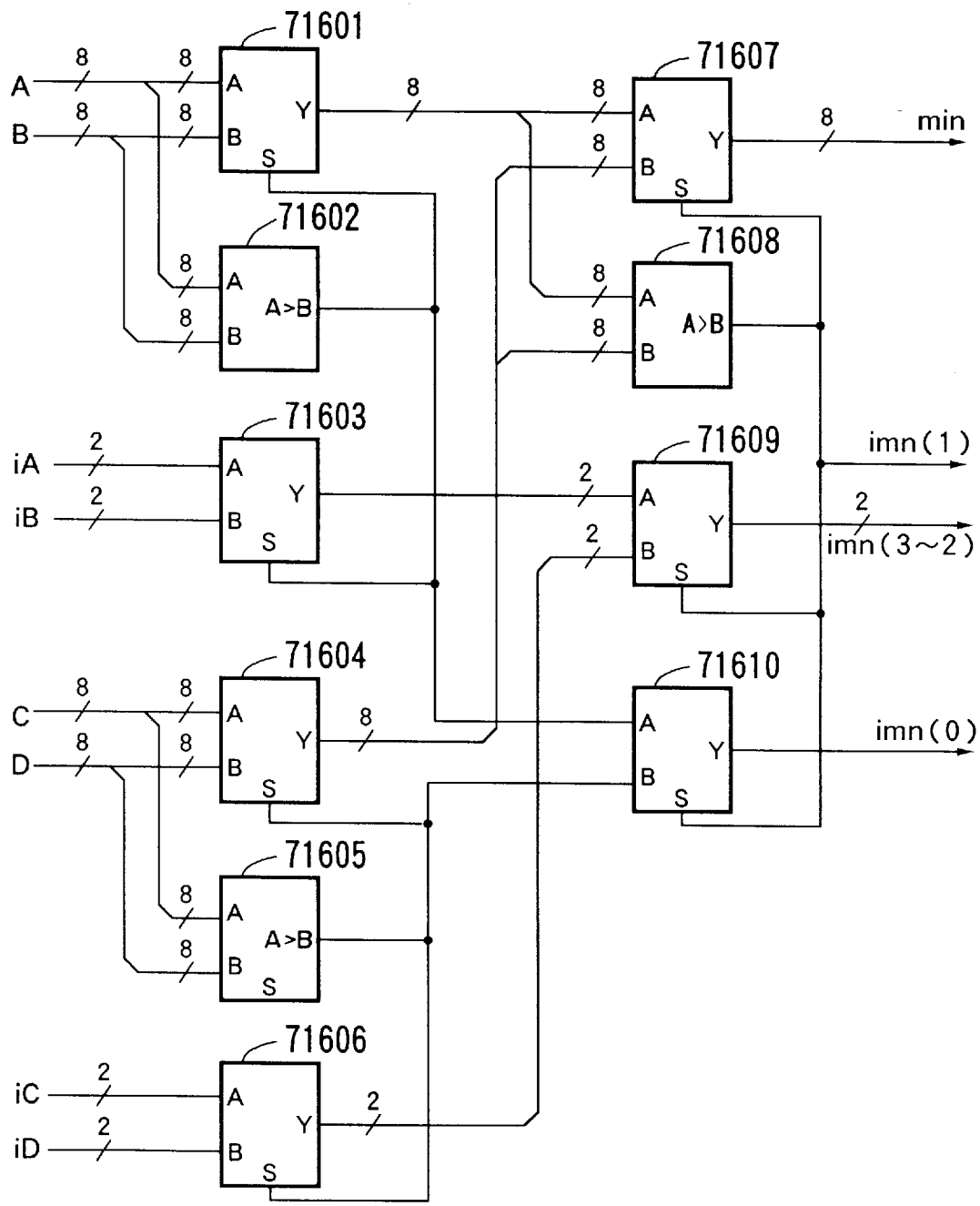
FIG. 21 is a block diagram showing a circuit 71315 for retrieving minimum value in a main-scan direction in FIG. 18.

As shown in FIG. 21, the circuit 71315 includes a 2-to-1 selector 71601 and a comparator 71602. If A>B holds, the output of the comparator 71602 goes to logical "1" and the B signal appears at the Y output of the selector 71601. If A≦B holds, on the other hand, the output of the comparator 71602 goes to logical "0" and the A signal appears at the Y output of the selector 71601. As a result, the value of min(A,B) appears at the Y output of the selector 71601. Similarly, iB is delivered from the Y output of a selector 71603 if A>B holds, and iA is delivered from the Y output of the selector 71603 if A≦B holds.

The circuit 71315 further includes a 2-to-1 selector 71604 and a comparator 71605. If C>D holds, the output of the comparator 71605 goes to logical "1" and the D signal appears at the Y output of the selector 71604. If C≦D holds, on the other hand, the output of the comparator 71605 goes to logical "0" and the C signal appears at the Y output of the selector 71604. As a result, the value of min(C,D) appears at the Y output of the selector 71604. Similarly, iD is delivered from the Y output of a selector 71606 if C>D holds, and iC is delivered from the Y output of the selector 71606 if C≦D holds.

The circuit 71315 further includes a 2-to-1 selector 71607, a comparator 71608 and 2-to-1 selectors 71609, 71610. If min(A,B)>min(C,D) holds, the output of the comparator 71608 goes to logical "1" and min(C,D) appears at the Y output of the selector 71607. If min(A,B)≦min(C,D) holds, the output of the comparator 71608 goes to logical "0" and min(A,B) appears at the Y output of the selector 71607. As a result, the value of min(A,B,C,D) appears at the Y output of the selector 71607.

Further, as a result of the foregoing, the value of imn is decided as follows depending upon which of the inputs of A, B, C, D takes on the minimum value:
Specifically, imn(3~2)=iA, imn(1)=0, imn(0)=0 are established when A takes on the minimum value;

imn(3~2)=iB, imn(1)=0, imn(0)=0 are established when B takes on the minimum value;

imn(3~2)=iC, imn(1)=0, imn(0)=0 are established when C takes on the minimum value; and imn(3~2)=iD, imn(1)=0, imn(0)=0 are established when D takes on the minimum value. Here imn is a signal indicating the position (coordinates) at which the L* signal takes on the minimum value in the 4×4 pixel block.

In FIGS. 17 and 18, numeral 71316 denotes a subtractor for outputting a value obtained by subtracting the minimum value min from the maximum value max of the L* signal in the 4×4 pixel block. Numerals 71317, 71318, 71319 denotes 2-to-1 selectors, and numerals 71320, 71321, 71322 denote flip-flops. As shown in FIG. 34, a signal XD1 is synchronized to the CLK signal and XPHS signal and becomes "0" only when the XPHS signal is "0"; at all other times, the XD1 signal is "1". The LGAIN signal, which is equivalent to (maximum value—minimum value) of the lightness signal L* in a 4×4 block, the LMX signal indicative of position (coordinates) within the 4×4 pixel block in a case where the L* signal takes on the maximum value, and the LMN signal indicative of position (coordinates) within the 4×4 pixel block in a case where the L* signal takes on the minimum value are outputted at the timing shown in FIG. 34.

[Coder 114 for chromaticity component]

Figure 22:
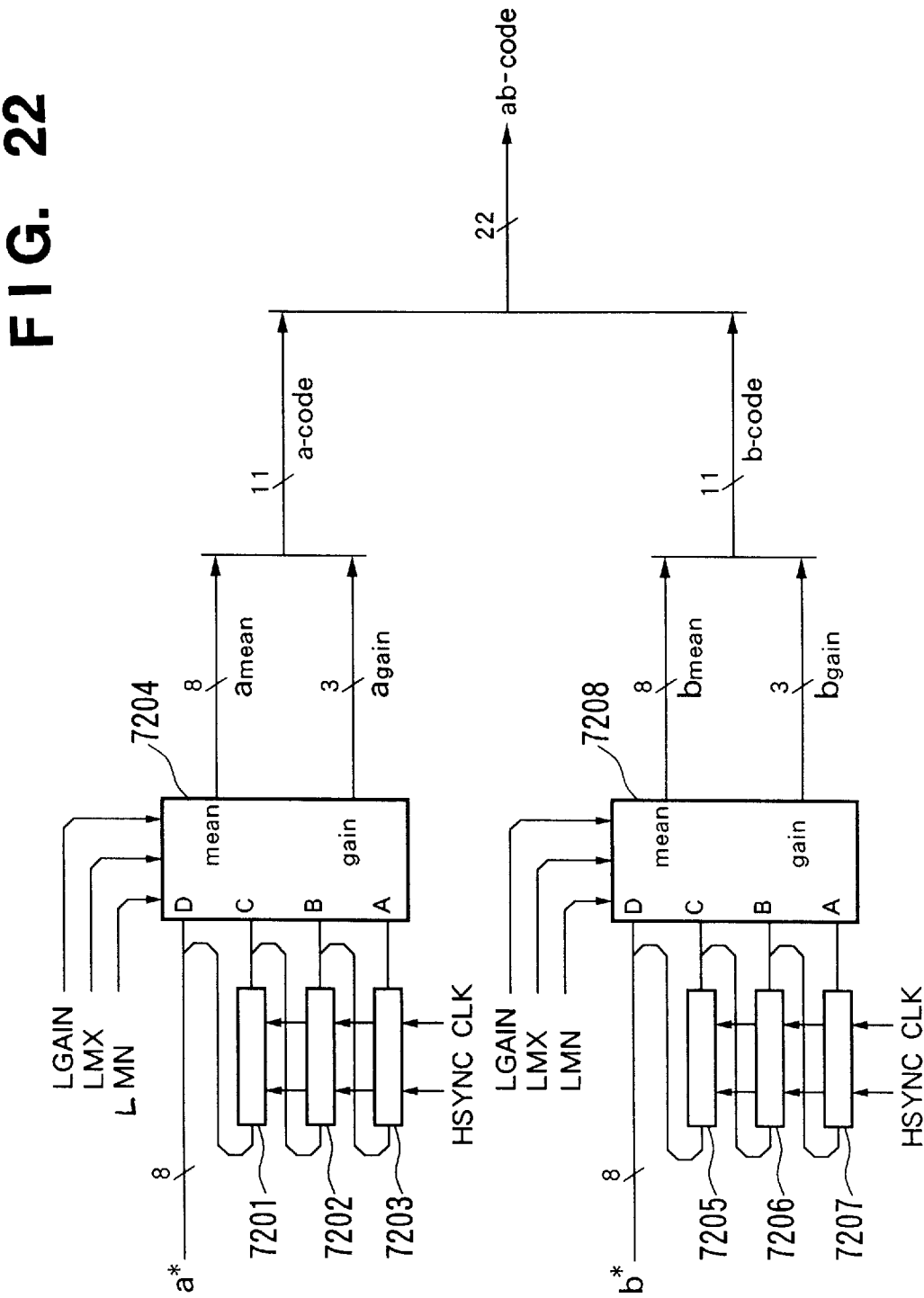
FIG. 22 is a block diagram showing a chromaticity-information coder 114 in FIG. 2.
Figure 35:
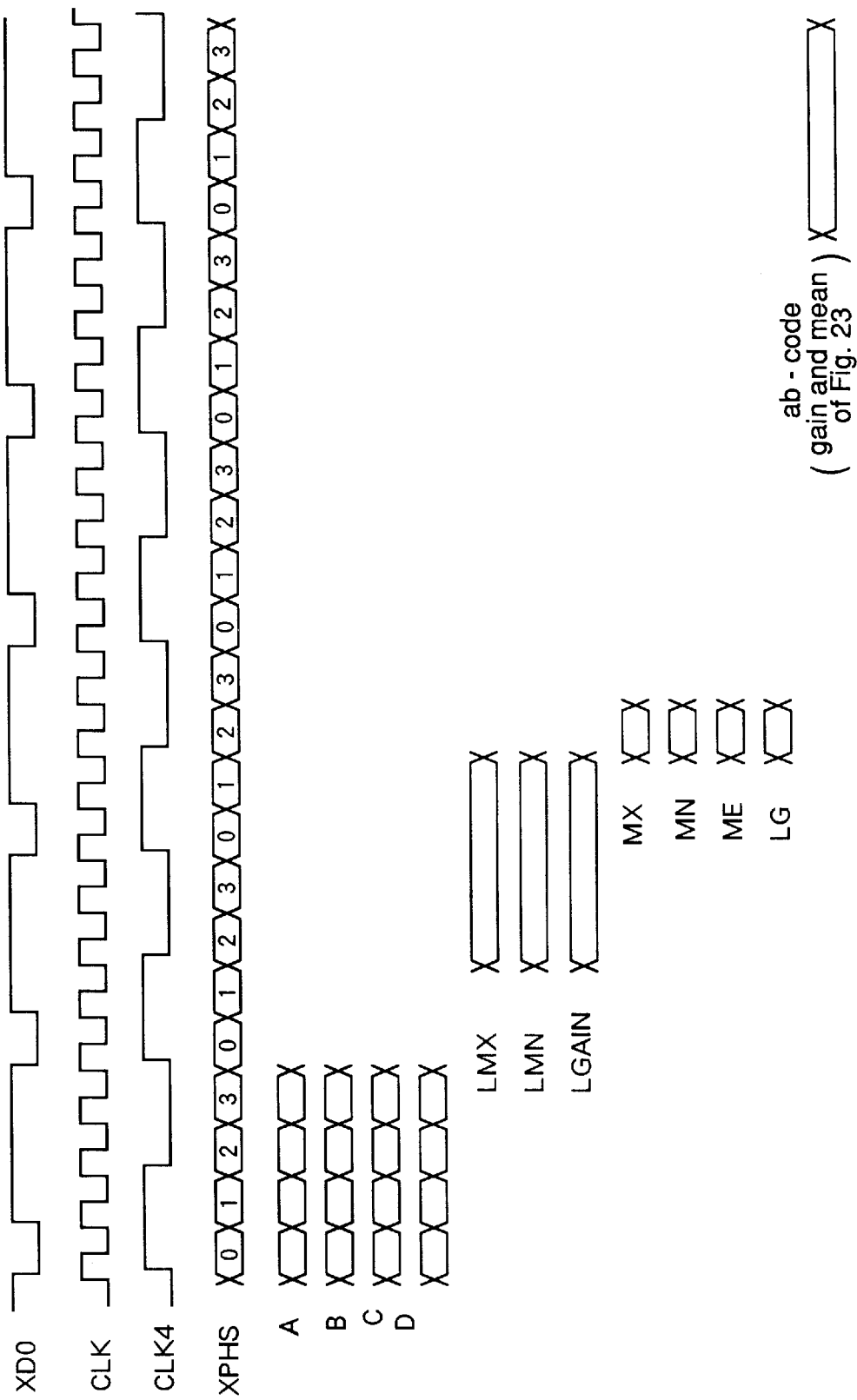
FIG. 35 is a timing chart associated with a coder 114 of FIG. 1.

FIG. 22 is a block diagram showing the coder 114 of FIG. 1 for coding the chromaticity information, and FIG. 35 is the associated timing chart.

As shown in FIG. 22, the coder 114 includes line memories 7201, 7202, 7203 for applying a one-line delay. These process the a* signal in the chromaticity information, with processing being executed in a 4×4 pixel block. A quantizer circuit 7204 quantizes the a* signal. The coder 114 further includes line memories 7205, 7206, 7207 for applying a one-line delay. These process the b* signal in the chromaticity information, with processing being executed in a 4×4 pixel block. A quantizer circuit 7208 quantizes the b* signal. The outputs of the quantizers 7204, 7208 are combined and outputted as ab-code.

Figure 23:
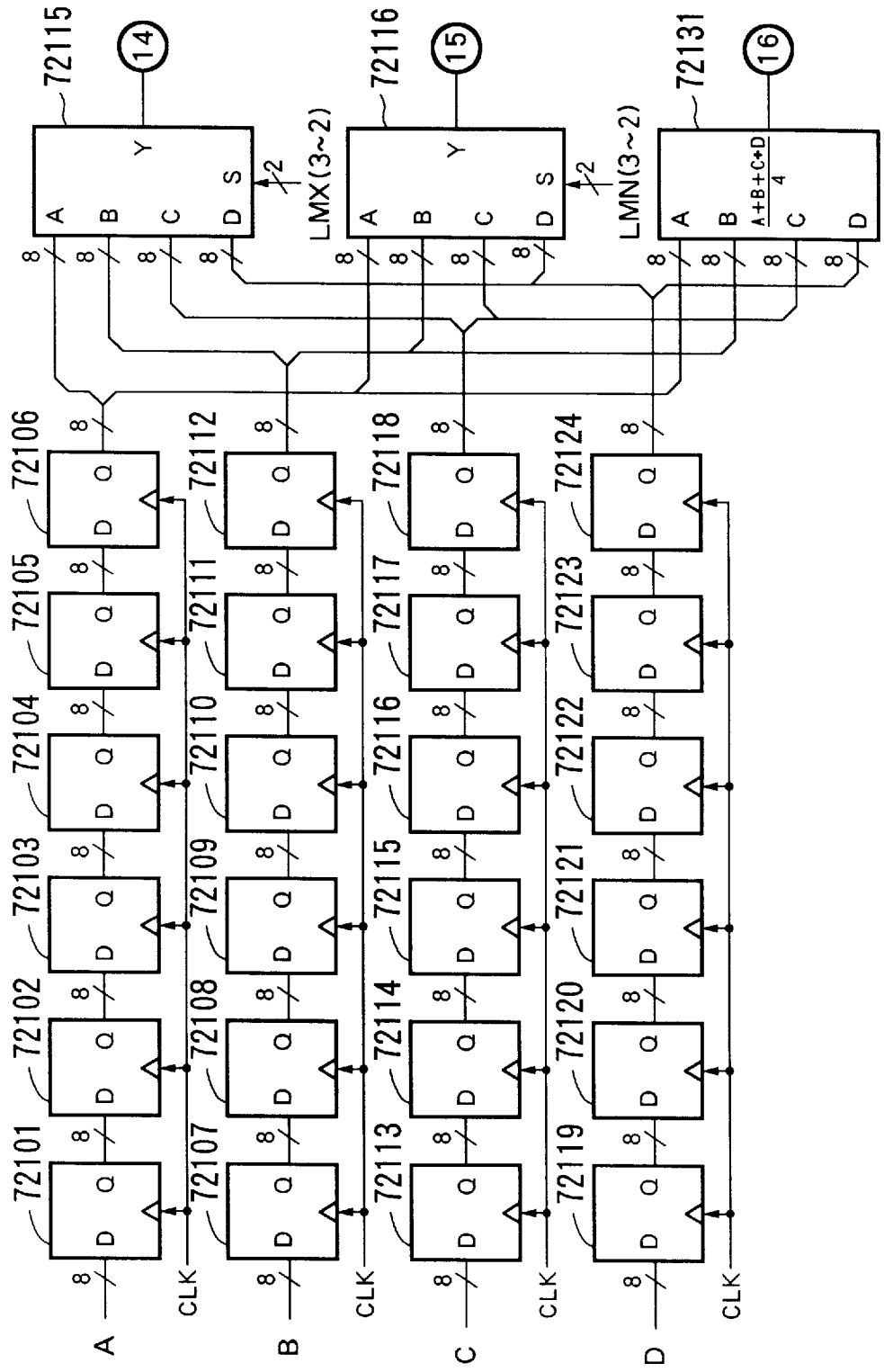
FIGS. 23~25 are block diagrams showing circuits 7204 and 7208 in FIG. 22.
Figure 24:
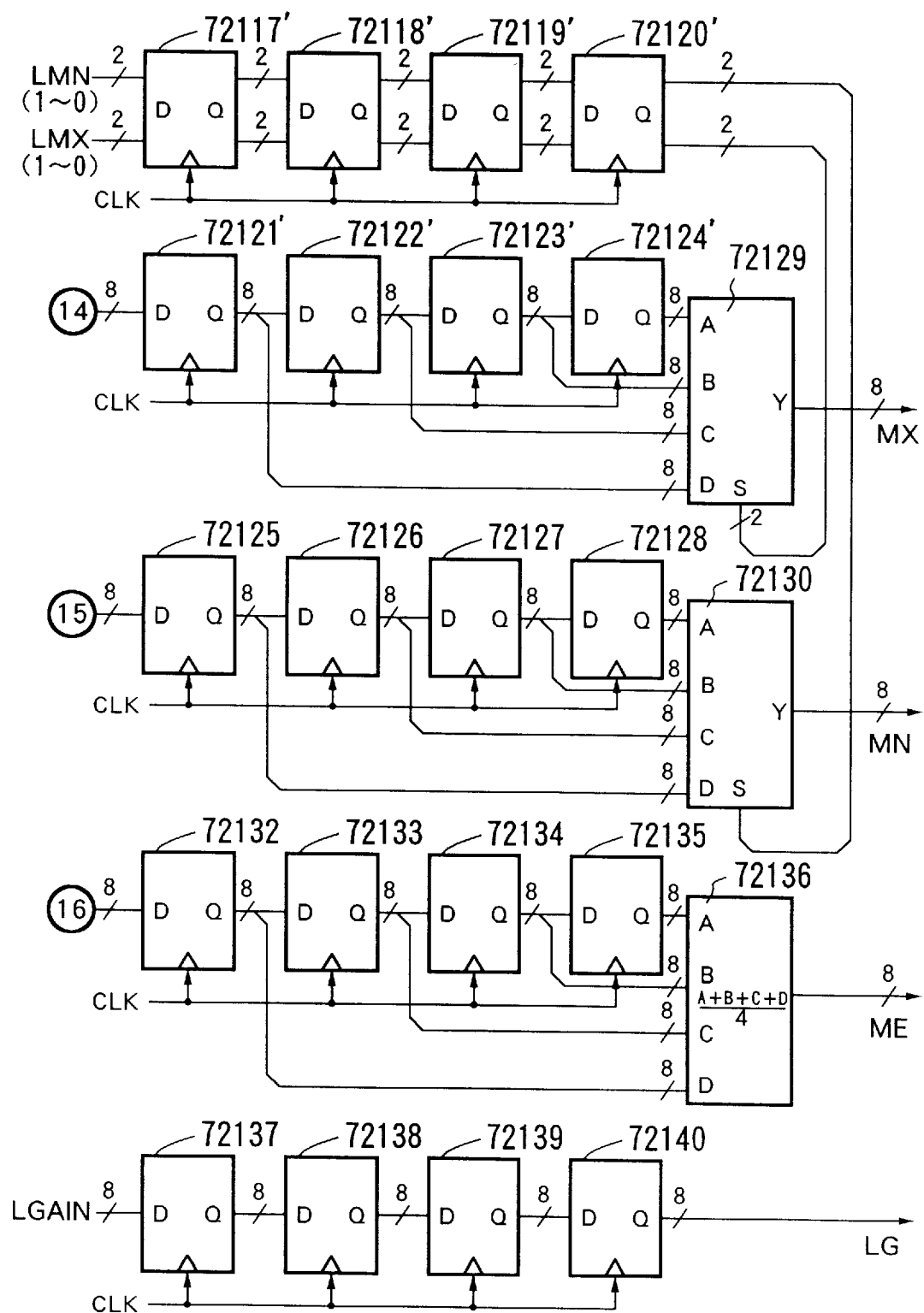
Figure 25:
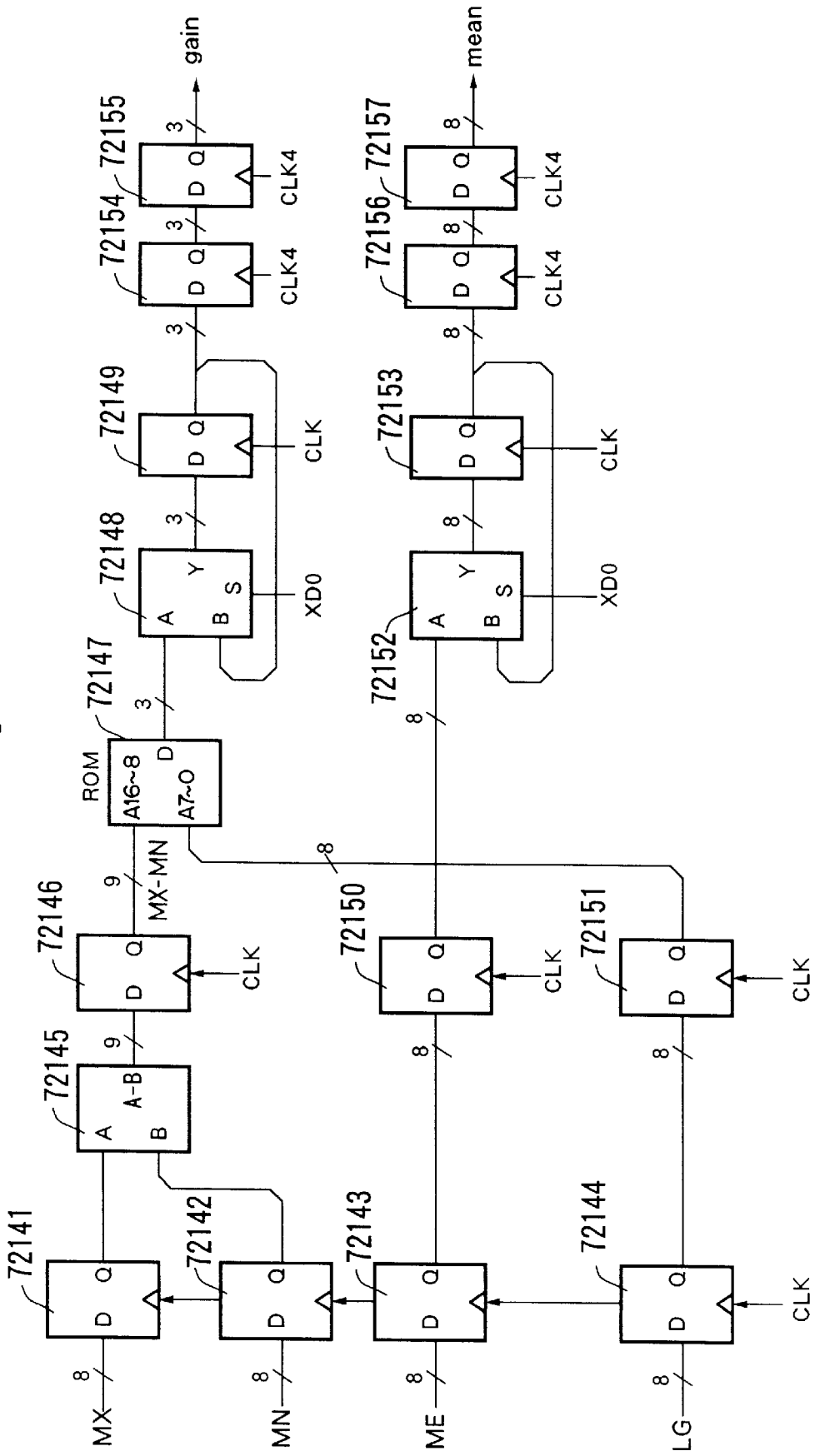

FIGS. 23~25 are block diagrams showing the a* quantizer 7204. It should be noted that the b* quantizer 7208 has the same construction as the a* quantizer 7204. As shown in FIGS. 23 and 24, the a* quantizer 7204 includes flip-flops 72101, 72102, 72103, 72104, 72105, 72106, 72107, 72108, 72109, 72110, 72111, 72112, 72113, 72114, 72115, 72116, 72117, 72118, 72119, 72120, 72121, 72122, 72123, 72124 each for applying a delay synchronized to the leading edge of the CLK signal so as to achieve synchronization with the coder for the lightness information. Also included are 4-to-1 selectors 72115, 72116 for delivering the value of the A input as a Y output if the s input is "0"; the value of the B input as a Y output if the s input is "1"; the value of the C input as a Y output if the s input is "2"; and the value of the D input as a Y output if the s input is "3". The two higher order bits of the LMX signal enter the s input of the selector 72115, and the two higher order bits of the LMN signal enter the s input of the selector 72116. In FIG. 24, flip-flops 72117', 72118', 72119', 72120', 72121', 72122', 72123', 72124', 72125, 72126, 72127, 72128, 72132, 72133, 72134, 72135, 72137, 72138, 72139, 72140 each apply a delay synchronized to the leading edge of the CLK signal. Numerals 72129, 72130 denote 4-to-1 selectors similar to the selectors 72115, 72116. The two lower order bits of the synchronized LMX signal enter the s input of the selector 72129, and the two lower order bits of the synchronized LMN signal enter the s input of the selector 72130. As a result, the value of a* (the value of b* in the case of the coder 7208) at the position (coordinates) at which the L* signal takes on the maximum value within the 4×4 pixel block is outputted as MX, and the value of a* (the value of b* in the case of the coder 7208) at the position (coordinates) at which the L* signal takes on the minimum value within the 4×4 pixel block is outputted as MN.

Numeral 72131 denotes an average-value calculating unit for outputting the average value (A+B+C+D)/4 of the four inputs A, B, C, D. Flip-flops 72132, 72133, 72134, 72135 apply a delay synchronized to the leading edge of the CLK signal. Numeral 72136 denotes an average-value calculating unit, similar to the calculating unit 72131, for outputting the average value (A+B+C+D)/4 of the four inputs A, B, C, D. As a result, the average value of a* (the average value of b* in the case of the coder 7208) within the 4×4 pixel block is outputted as ME. Flip-flops 72137, 72138, 72139, 72140 apply a delay synchronized to the leading edge of the CLK signal, and the LGAIN signal is synchronized to each of the signals MX, MN, ME and is outputted as a signal LG.

With reference to FIG. 25, the signals MX, MN, ME, LG are synchronized to the leading edge of the CLK signal by flip-flops 72141, 72142, 72143, 72144. Numeral 72145 denotes a subtractor for subtracting the value of MN from the value of MX, thereby calculating the difference value between a* at the position at which the L* signal takes on the maximum value and a* at the position at which the L* signal takes on the minimum value (the difference value between the two values of b* in the case of the coder 7208) within the 4×4 pixel block. Numerals 72146, 72150, 72151 denote flip-flops. The difference value calculated by the subtractor 72146 enters the higher-order address of a look-up ROM 72147 via the flip-flop 72146, and the LG signal enters the lower-order address of a look-up ROM 72147 via the flip-flops 72144, 72151. The value of the ratio (MX-MN)/LG of the amplitude of the AC component, of the a* signal to the amplitude of the AC component of the L* signal within the 4×4 pixel block is quantized to three bits, and the results are written in the look-up table ROM 72147 in advance. This ratio is read out as data. Numerals 72148, 72152 denote 2-to-1 selectors, and numerals 72149, 72150, 72155, 72153, 72156, 72157 denote flip-flops. As a result, signals gain and mean are outputted at the timing shown in FIG. 35.

[Apparatus timing chart]

Figure 31:
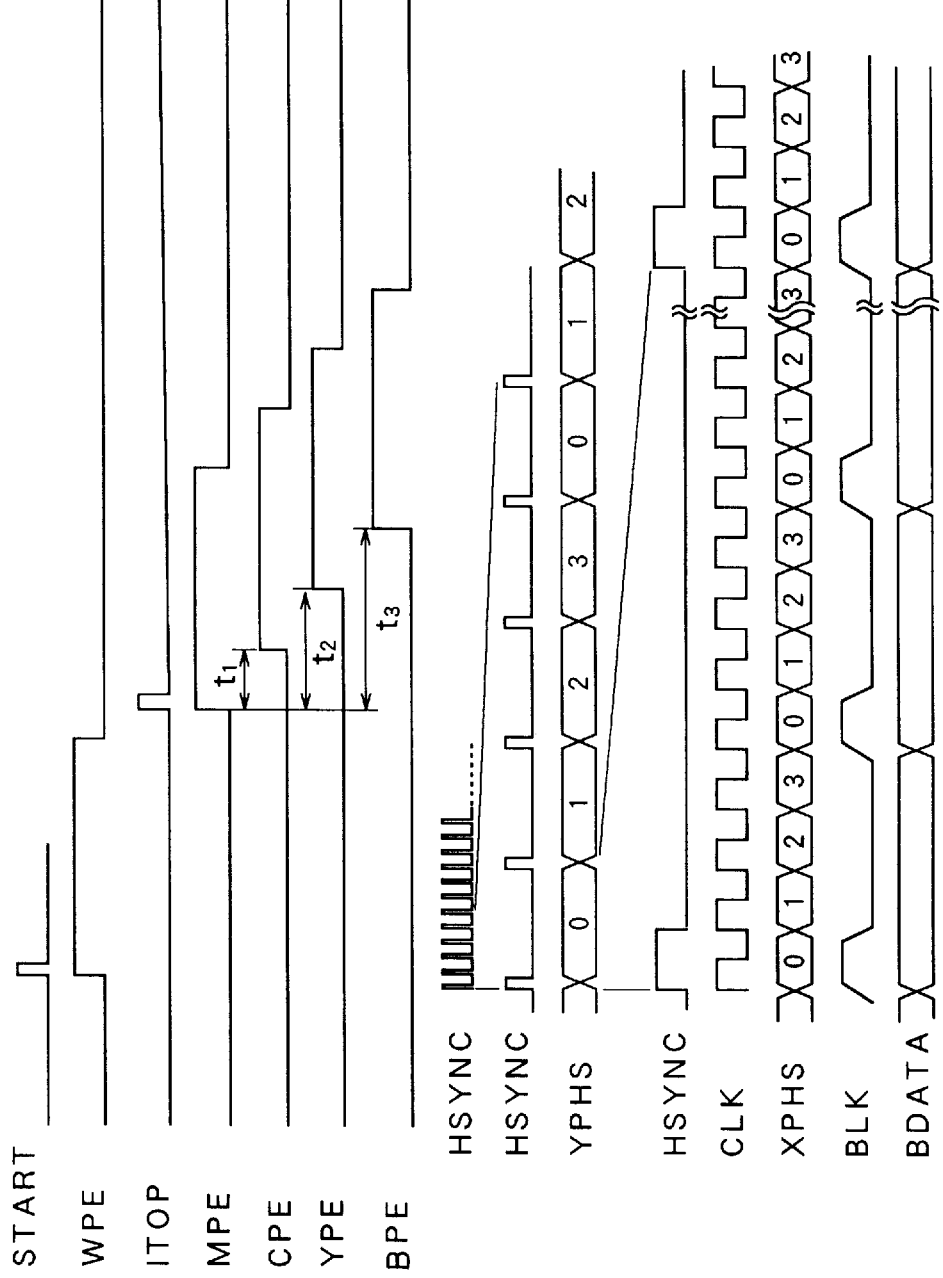
FIG. 31 is a timing chart associated with the apparatus of this embodiment.

FIG. 31 illustrates the apparatus timing chart according to this embodiment. A START signal indicates the start of reading of an original, and a WPE signal indicates an interval over which the image scanner reads the original, performs coding processing of the image data read and writes the coded data in memory. An ITOP signal indicates the start of a printing operation, and MPE, CPE, YPE, BPE signals indicate intervals over which the magenta, cyan, yellow and black semiconductor lasers 216, 215, 214, 213, respectively, in FIG. 3 are driven.

As shown in FIG. 31, the CPE, YPE, BPE signals are delayed by $t_1$, $t_2$, $t_3$, respectively, with respect to the MPE signal. This is controlled in such a manner that the relations $t_1=d_1/v$, $t_2=d_2/v$, $t_3=d_3/v$ (where v represents the feed rate of the recording paper) will hold among $d_1$, $d_2$, $d_3$ in FIG. 3.

Figure 30:
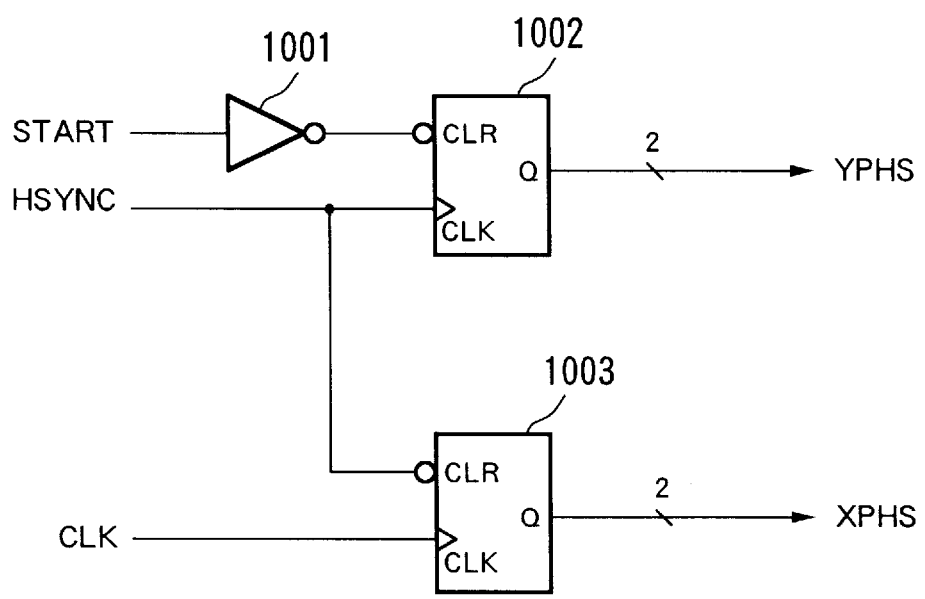
FIG. 30 is a block diagram showing the configuration of a two-bit main-scan counter in this embodiment.

An HSYNC signal is a main-scan synchronizing signal, and the CLK signal is the pixel synchronizing signal. Signal YPHS represents the value of a count in a two-bit sub-scan counter, and signal XPHS represents the value of a count in a two-bit main-scan counter. As shown in FIG. 30, the signals YPHS, XPHS are generated by circuitry constituted by an inverter 1001 and two-bit counters 1002 and 1003.

A BLK signal in FIG. 31 is a synchronizing signal for a 4×4 pixel block. Processing is executed in units of 4×4 pixel blocks at the timing indicated by BDATA.

[Area processing]

Figure 29:
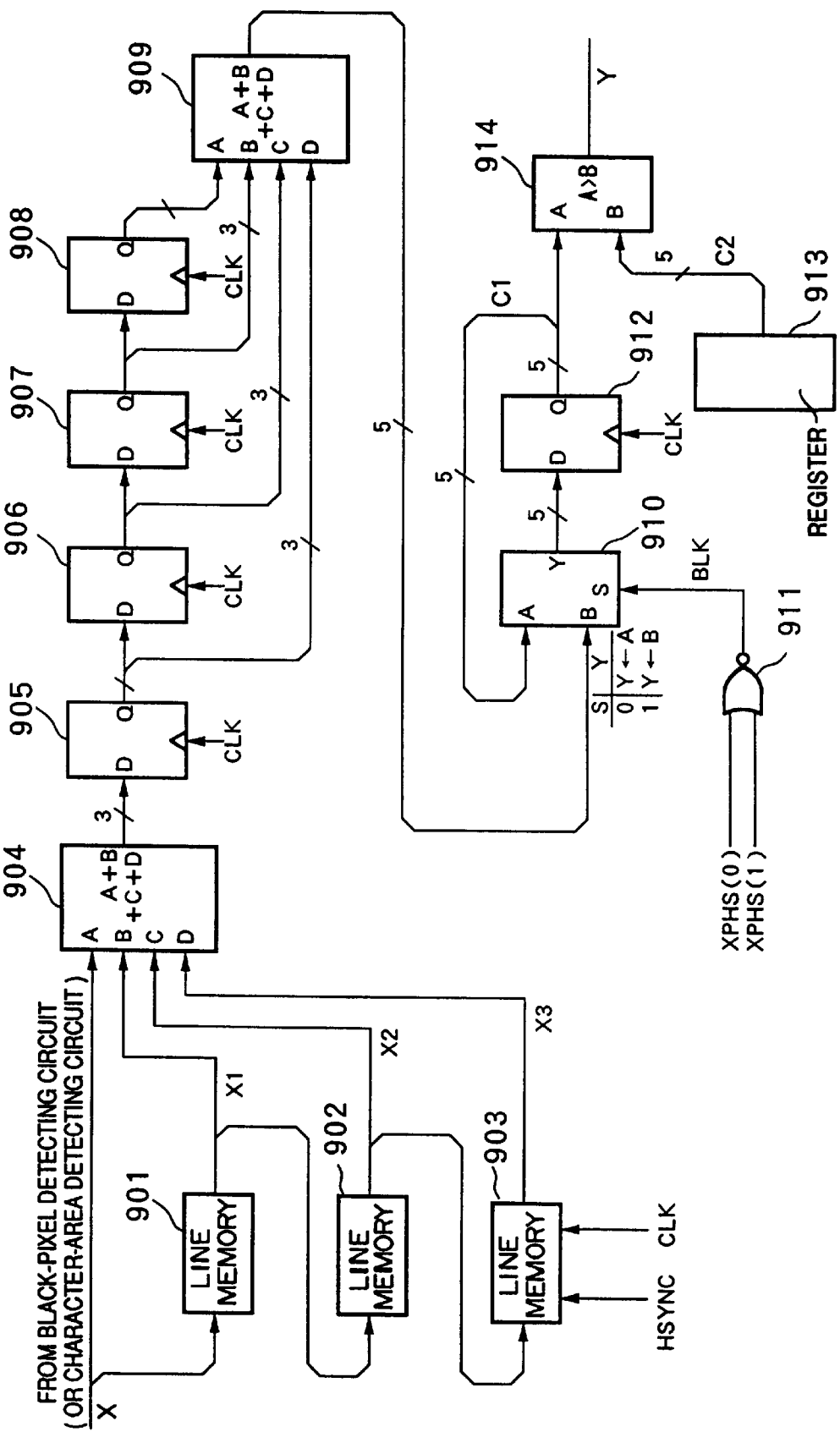
FIG. 29 is a block diagram showing an area processing circuit 115-11 and an area processing circuit 115-21 in FIG. 1.

FIG. 29 is a block diagram illustrating the 4×4 area processing circuit 115-11 (or 115-21). Here CLK and HSYNC indicate the aforementioned pixel synchronizing signal and main-scan synchronizing signal, respectively. Numerals 901, 902, 903 denote line memories for applying a delay of one line each. Thus, signals $X_1$, $X_2$, $X_3$ are delayed respectively by one, two and three lines, relative to an input X, in the sub-scan direction. Numeral 904 denotes an adder for counting the number of "1"'s in X, $X_1$, $X_2$, $X_3$ that correspond to four pixels in the sub-scan direction of a binary signal X. Accordingly, an adder 909 calculates the number of pixels at "1" in the 4×4 pixel block.

Numeral 910 denotes a 2-to-1 selector, 911 a NOR gate and 912 a flip-flop. A number $C_1$ of pixels at the counted X="1" is calculated in units of 4×4 blocks in synchronism with the BLK signal produced in accordance with XPHS(0) and YPHS(1), and this is compared with a comparison value $C_2$ that has been set beforehand in a register 913. The output Y becomes "1" only when $C_1>C_2$ holds and is "0" at all other times. The output is delivered at the timing indicated by BDATA in FIG. 31.

The characterizing feature here is that the image codes L-code, ab-code obtained by coding and the feature signals K1, K2 extracted by the feature extracting circuit are in 1:1 correspondence in the 4×4 block unit shown in FIG. 26.

More specifically, the image codes and feature signals are extracted in 4×4 pixel block units, stored at the same memory address or at an address calculated from the same address and can be read out in correlated form.

In other words, the image information and feature (attribute) information are stored in correlated form at the same memory address or at an address calculated from the same address, thus making it possible to make joint use of or simplify a writing and reading control circuit of the memory, by way of example. Further, if editing processing such as zoom/rotation is performed in memory, this can be accomplished through simple processing, thus making it possible to optimize the system.

Figure 32:
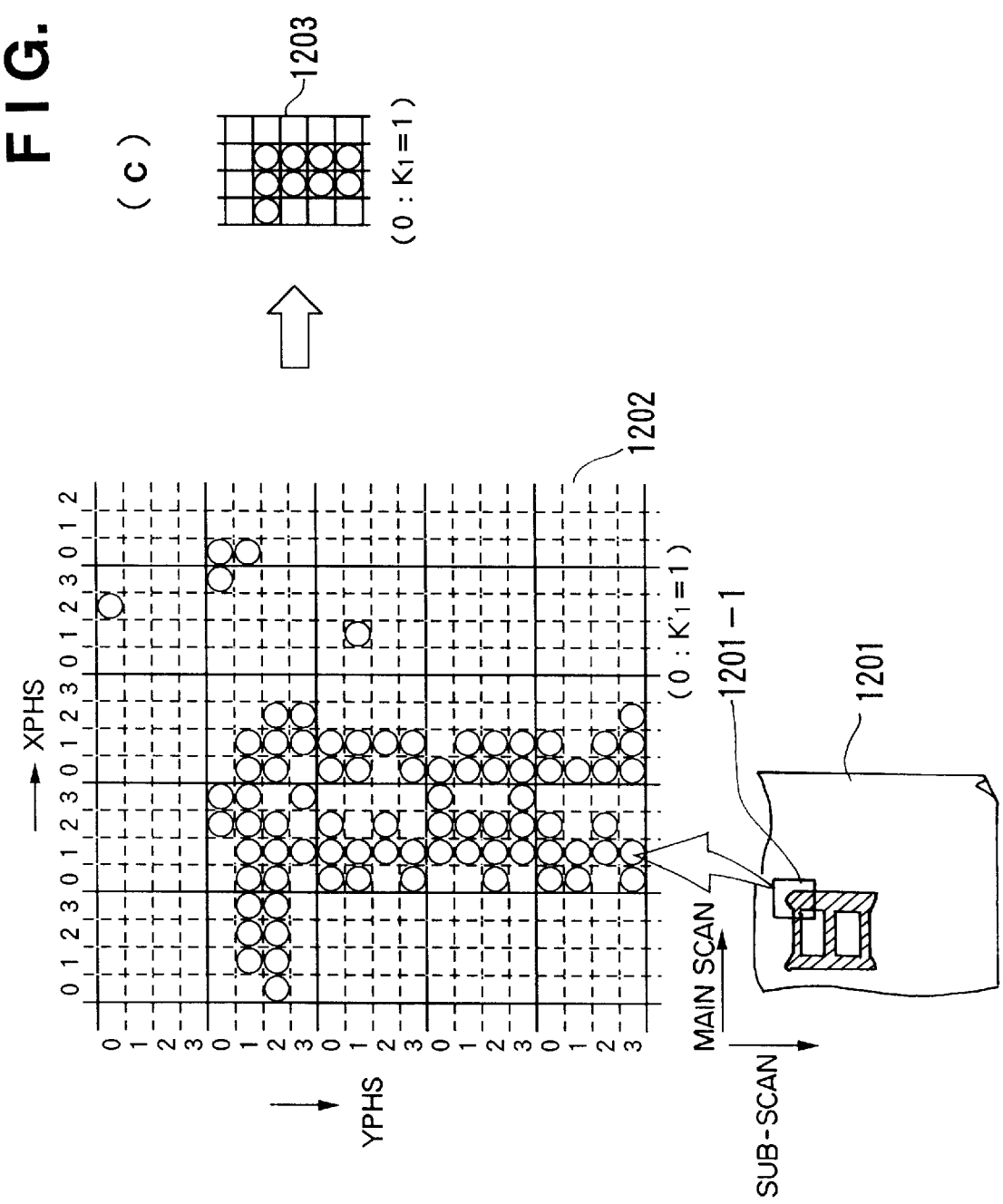
FIG. 32 is a diagram showing a specific example of area processing in this embodiment.

FIG. 32 illustrates a specific example of area processing with regard to character-pixel detection. Assume that the original is of the kind shown at 1201 in FIG. 32. In a portion 1201-1 of the original, each pixel is judged to determine whether it is a character pixel or not. Let $K_1'=1$ hold for a pixel judged to be a character pixel. These pixels are indicated by the circles "○" in the area 1202. Let $K_1'=0$ hold for all other pixels. In the area processing circuit 115-11, processing of the kind shown in FIG. 32 is executed, where $C_2=4$ is set, by way of example. As a result, a signal $K_1$ of the kind indicated at 1203, in which noise has been reduced, can be obtained for a 4×4 block.

Similarly, owing to processing executed by a similar circuit (115-21 in FIG. 1) with regard to the result of the decision $K_2'$ of the black-pixel detecting circuit, a signal $K_2$ corresponding to a 4×4 block can be obtained.

[Decoder 117 (117', 117", 117''') for lightness component]

Figure 36:
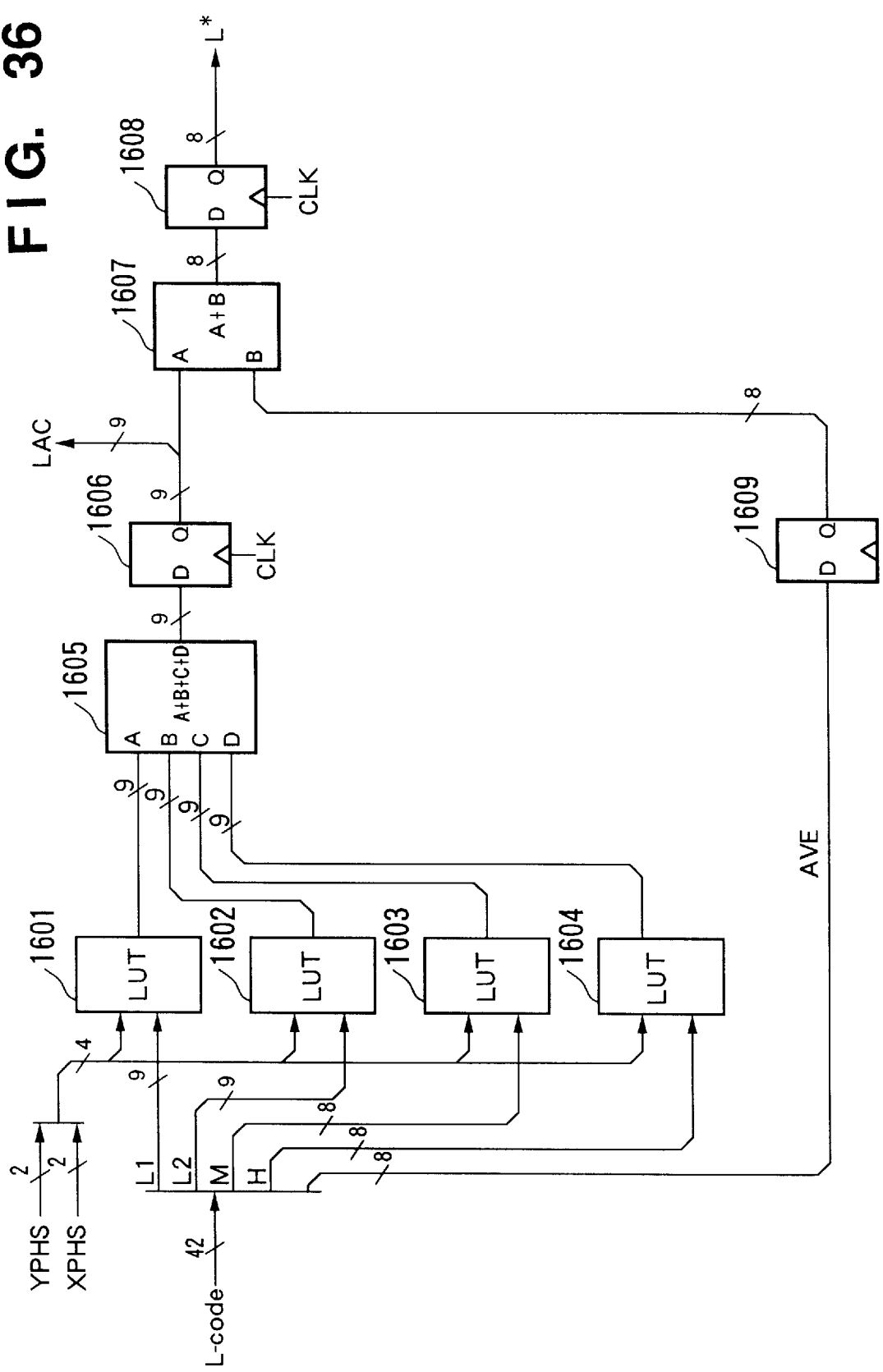
FIG. 36 is a block diagram showing a decoder 117 in FIG. 2.

FIG. 36 is a block diagram of the lightness-component decoder 117 (decoders 117', 117", 117''' are identically constructed).

In the decoding of lightness information, data decoded by the L-code read out of the image memory 116 is subjected to a reverse Hadamard transform, whereby the L* signal is decoded. The reverse Hadamard transform is a transform that is the reverse of the Hadamard transform indicated by Equation (3) and is defined by Equation (4) below $$\begin{bmatrix} X_{11}X_{12}X_{13}X_{14} \\ X_{21}X_{22}X_{23}X_{24} \\ X_{31}X_{32}X_{33}X_{34} \\ X_{41}X_{42}X_{43}X_{44} \end{bmatrix} = (1/4) \cdot H \cdot \begin{bmatrix} Y_{11}Y_{12}Y_{13}Y_{14} \\ Y_{21}Y_{22}Y_{23}Y_{24} \\ Y_{31}Y_{32}Y_{33}Y_{34} \\ Y_{41}Y_{42}Y_{43}Y_{44} \end{bmatrix} \cdot H^T \quad (4)$$

where H is a 4×4 Hadamard matrix shown below $$H = \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

and $H^T$ is a transposed matrix.

The Hadamard transform and reverse Hadamard transform are linear operations. In a case where the Hadamard transform or reverse Hadamard transform of a matrix X is expressed by H(X), Equation (5) below holds in general.

$$H(X_1+X_2+\ldots+X_n)=H(X_1)+H(X_2)\ldots+H(X_n) \quad (5)$$

This property is utilized to separate the reverse Hadamard transform into frequency bands, which are defined by the lightness-information coder, and these transforms are performed in parallel.

Let $Y_{L1}$ represent a data matrix decoded by the code of $L_1$, let $Y_{L2}$ represent a data matrix decoded by the code of $L_2$, let $Y_M$ represent a data matrix decoded by the code of M, and let $Y_H$ represent a data matrix decoded by the code of H. Under these conditions, Equation (6) below holds.

$$H(Y_{L1}+Y_{L2}+Y_M+Y_H)=H(Y_{L1})+H(Y_{L2})+H(Y_M)+H(Y_H) \quad (6)$$

Numerals 1601, 1602, 1603, 1604 denote look-up ROM's. The codes of L1, L2, M and H enter the lower order addresses of the look-up ROM's 1601, 1602, 1603 and 1604, respectively. These look-up. ROM's store the results of executing the coding processing and the processing of the reverse Hadamard transform in advance. The signals XPHS, YPHS enter the four higher order bits of the addresses of each ROM. As a result, it is possible to output a value, which results from the reverse Hadamard transformation, at the position (coordinates) of each 4×4 pixel block.

Furthermore, numeral 1605 denotes an adder, which is for performing an addition operation corresponding to Equation (6). The adder 1605 adds the results of the reverse Hadamard transformation in each of the frequency components (L1, L2, M, H). As a result of the addition operation, the AC component within the 4×4 pixel block of the L* signal is obtained and is outputted as a frequency component LAC of L* via a flip-flop 1607.

If decoding is performed collectively without using this method, a code having a total of 34 bits and a look-up table having an address space (64 gigabytes) of a total of 36 bits of the four-bit coordinate position (XPHS, YPHS) will be necessary. This is not realistic even if it can be achieved. By using the above-described method, it will suffice to prepare a number of ROM's having an address space (8 kilobytes) of 13 bits at most, thus enabling a simplification in construction. In addition, it is easy to deal with situations in which code length is changed.

Numeral 1607 denotes an adder for adding the average value AVE, within the 4×4 block, of the L* signal and the above-mentioned AC component LAC, thereby obtaining the L* signal after decoding. This is outputted upon being synchronized to the leading edge of the CLK signal by the flip-flop 1608.

[Decoder 118 (118', 118", 118''') for chromaticity component]

Figure 37:
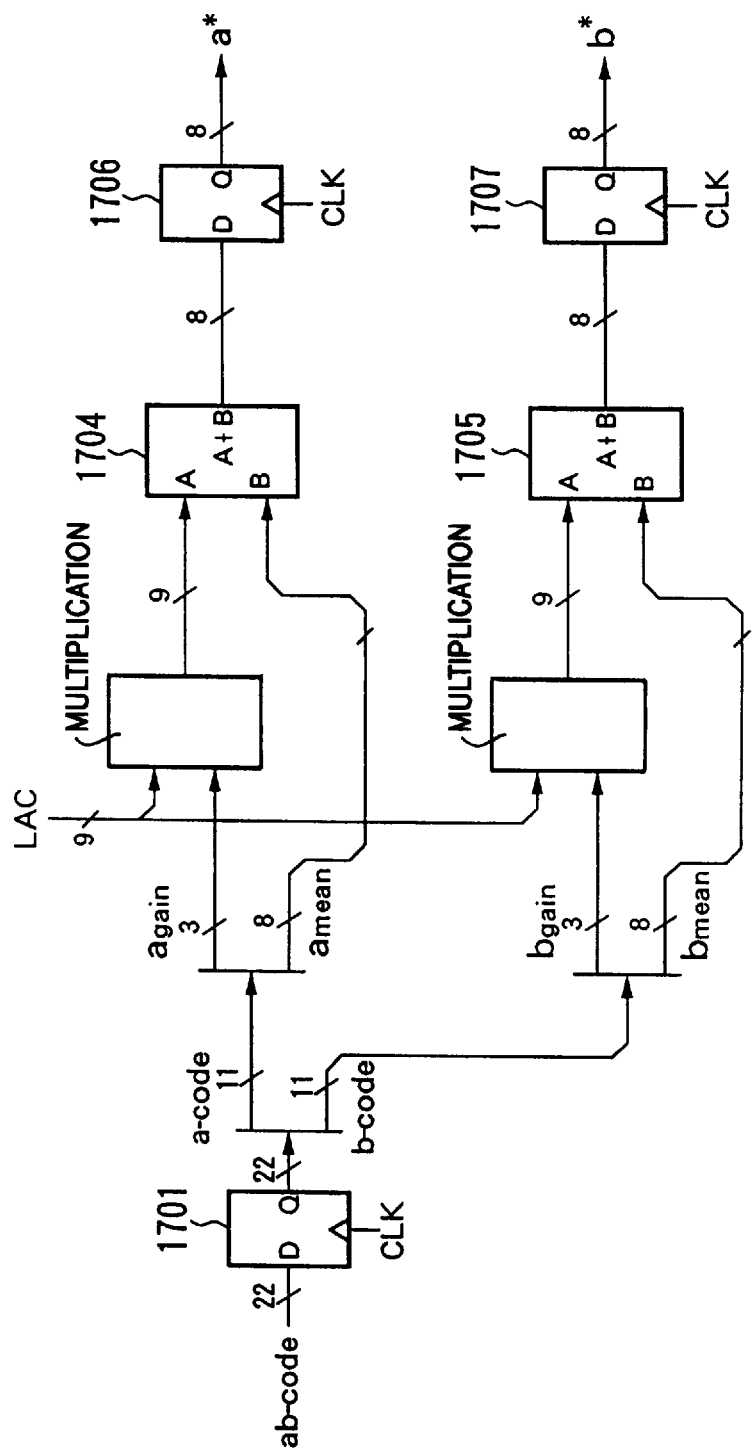
FIG. 37 is a block diagram showing a decoder 118 in FIG. 2.

FIG. 37 is a block diagram of the chromaticity-component decoder 118 (decoders 118', 118", 118''' are identically constructed).

First, the signal ab-code read out of the image memory 116 is synchronized to the leading edge of the CLK signal by a flip-flop 1701, the code is separated into a-code and b-code, as shown in FIG. 22, a-code is further separated into $a_{gain}$ and $a_{mean}$, and b-code is further separated into $b_{gain}$ and $b_{mean}$. A multiplier 1702 multiplies the AC component of the lightness information L* by the again signal, which is the ratio of the amplitude of the L* signal to the amplitude of the a* signal within the 4×4 pixel block. The product is outputted to an adder 1704. The adder 1704 adds the $a_{mean}$ signal, which is the DC component of the a* signal, to the output of the multiplier 1702, thereby decoding the a* signal. The decoded a* is outputted upon being synchronized to the leading edge of the CLK signal by a flip-flop 1706. Similarly, a multiplier 1703 multiplies the AC component of the lightness information L* by the $b_{gain}$ signal, which is the ratio of the amplitude of the L* signal to the amplitude of the b* signal within the 4×4 pixel block. The product is outputted to an adder 1705. The adder 1705 adds the $b_{mean}$ signal, which is the DC component of the b* signal, to the output of the multiplier 1703, thereby decoding the b* signal. The decoded b* is outputted upon being synchronized to the leading edge of the CLK signal by a flip-flop 1707.

[Color-space converter 119 (119', 119", 119''')]

Figure 11:
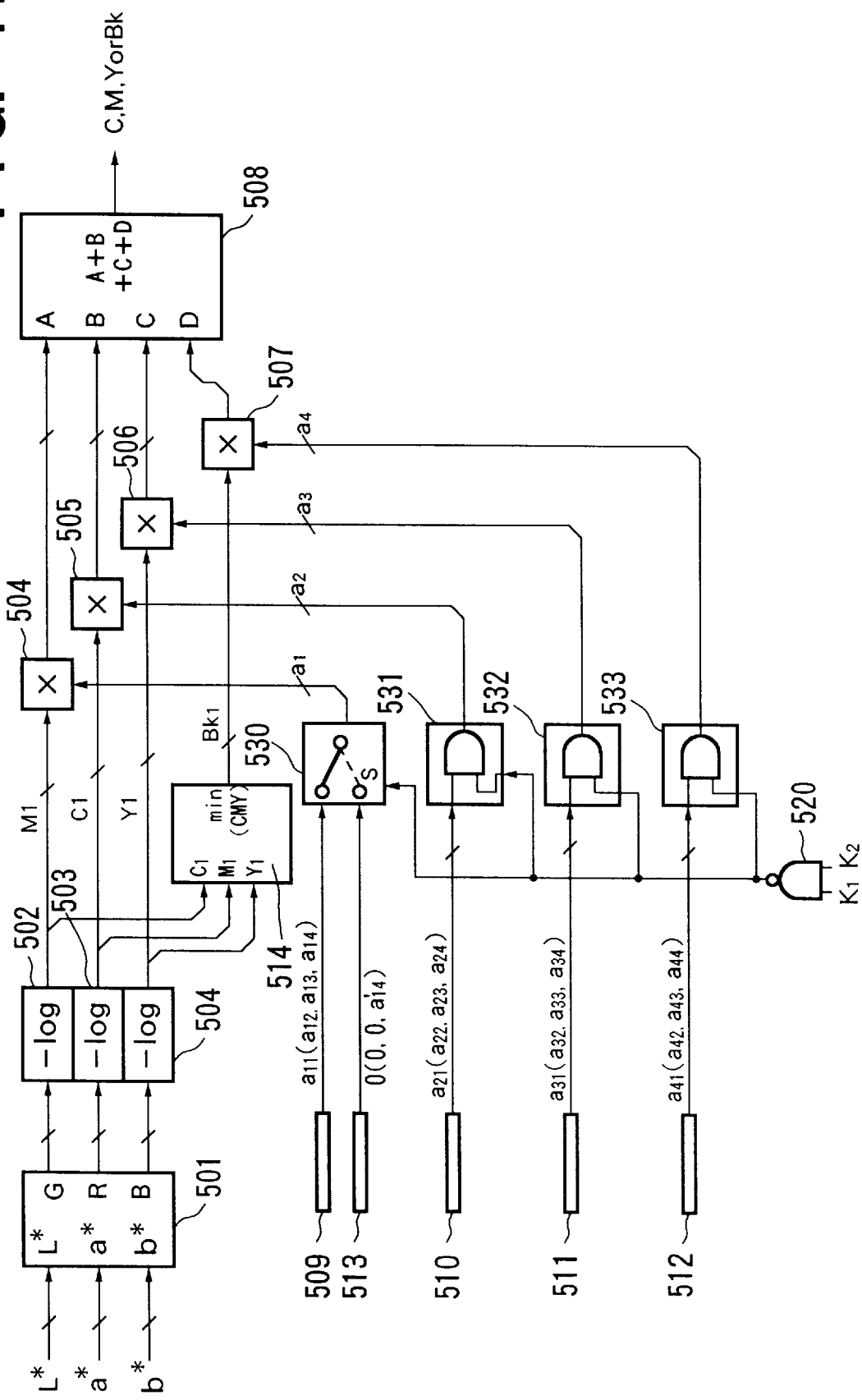
FIG. 11 is a block diagram showing a color-space converter in FIG. 2.

FIG. 11 is a block diagram showing the color-space converter 119 (the color-space converters 119', 119", 119''' are identically constructed). Numeral 501 denotes a circuit for converting the L*, a*, b* signals into R, G, B signals. This conversion is made in accordance with Equation (7) below.

$$\begin{bmatrix} R \\ G \\ B \end{bmatrix} = \begin{bmatrix} \beta_{11}' & \beta_{12}' & \beta_{13}' \\ \beta_{21}' & \beta_{22}' & \beta_{23}' \\ \beta_{31}' & \beta_{32}' & \beta_{33}' \end{bmatrix} \begin{bmatrix} X \\ Y \\ Z \end{bmatrix} \qquad (7)$$

where $$\begin{bmatrix} X \\ Y \\ Z \end{bmatrix} = \begin{bmatrix} x^3 \cdot x_0 \\ y^3 \cdot y_0 \\ z^3 \cdot z_0 \end{bmatrix} \qquad (8)$$

$$\begin{bmatrix} X \\ Y \\ Z \end{bmatrix} = \begin{bmatrix} \alpha_{11}' & \alpha_{12}' & \alpha_{13}' \\ \alpha_{21}' & \alpha_{22}' & \alpha_{23}' \\ \alpha_{31}' & \alpha_{32}' & \alpha_{33}' \end{bmatrix} \begin{bmatrix} L^* - \alpha_{14} \\ a^* - \alpha_{24} \\ b^* - \alpha_{34} \end{bmatrix} \qquad (9)$$

$[\alpha_{ij}']_{i,j=1,2,3}$ is a reverse matrix of $[\alpha_{ij}]_{i,j=1,2,3}$ in Equation (1), and $[\beta_{ij}']_{i,j=1,2,3}$ is a reverse matrix of $[\beta_{ij}]_{i,j=1,2,3}$ in Equation (2).

Numerals 502, 503, 504 denote luminance/density converters for performing the conversions indicated by Equations (10) below.

$$M_1 = -\log_{10} G$$

$$C_1 = -\log_{10} R \qquad (10)$$

$$Y_1 = -\log_{10} B$$

Numeral 514 denotes a black extracting circuit for outputting the minimum value of the $M_1$, $C_1$, $Y_1$ inputs as $Bk_1$, as indicated by the following equation:

$$Bk = \min(M_1, C_1, Y_1) \qquad (11)$$

Multipliers 504, 505, 506, 507 multiply the signals $M_1$, $C_1$, $Y_1$, $Bk_1$ by predetermined coefficients $a_1$, $a_2$, $a_3$, $a_4$, respectively, after which the products are added together by an adder 508. In other words, a sum of products indicated by Equation (12) below is performed.

$$(\text{Output } C, M, Y \text{ or } Bk) = a_1 M_1 + a_2 C_1 + a_3 Y_1 + a_4 Bk_1 \qquad (12)$$

Numerals 509, 510, 511, 512, 513 denote registers in which $a_{11}$, $a_{21}$, $a_{31}$, $a_{41}$, 0 are set for the color-space converter 119. Further, $a_{12}$, $a_{22}$, $a_{32}$, $a_{42}$, 0 are set in the respective registers of the color-space converter 119'; $a_{13}$, $a_{23}$, $a_{33}$, $a_{43}$, 0 are set in the respective registers of the color-space converter 119''; and $a_{14}$, $a_{24}$, $a_{34}$, $a_{43}$, $a_{14}'$ are set in the respective registers of the color-space converter 119'''.

Numerals 531, 532, 533 denote gate circuits, 530 a 2-to-1 selector circuit and 520 a NAND gate. Whether a pixel of interest resides in a black-character area or not is judged by the logical product of the black-pixel decision signal $K_1$ and the character-area decision signal $K_2$. The values of $a_1$, $a_2$, $a_3$, $a_4$ are selected in the manner shown in FIG. 12 based upon the results of this judgment. More specifically, in a case where the pixel of interest is not in a black-character area, the processing of Equation (13) below is executed. If the pixel of interest is in a black-character area, the processing of Equation (14) below is executed.

$$\begin{bmatrix} M \\ C \\ Y \\ Bk \end{bmatrix} = \begin{bmatrix} a_{11} a_{12} a_{13} a_{14} \\ a_{21} a_{22} a_{23} a_{24} \\ a_{31} a_{32} a_{33} a_{34} \\ a_{41} a_{42} a_{43} a_{44} \end{bmatrix} \begin{bmatrix} M_1 \\ C_1 \\ Y_1 \\ Bk_1 \end{bmatrix} \qquad (13)$$

$$\begin{bmatrix} M \\ C \\ Y \\ Bk \end{bmatrix} = \begin{bmatrix} 0 & 0 & 0 & 0 \\ 0 & 0 & 0 & 0 \\ 0 & 0 & 0 & 0 \\ a_{41}' & 0 & 0 & 0 \end{bmatrix} \begin{bmatrix} M_1 \\ C_1 \\ Y_1 \\ Bk_1 \end{bmatrix} \qquad (14)$$

In a black-character area, an output is produced solely in the color black (Bk), as indicated by Equation (14), whereby an output not having a color shift can be obtained. Outside a black-character, an output is produced in the four colors M, C, Y, Bk, as indicated by Equation (13). However, the $M_1$, $C_1$, $Y_1$, $Bk_1$ signals based upon the R, G, B signals read in by the CCD sensors are corrected to the M, C, Y, Bk signals, based upon the spectral distribution characteristics of the toners, by the operation of Equation (13). The signals M, C, Y, Bk are outputted.

[Space filter]

Figure 27:
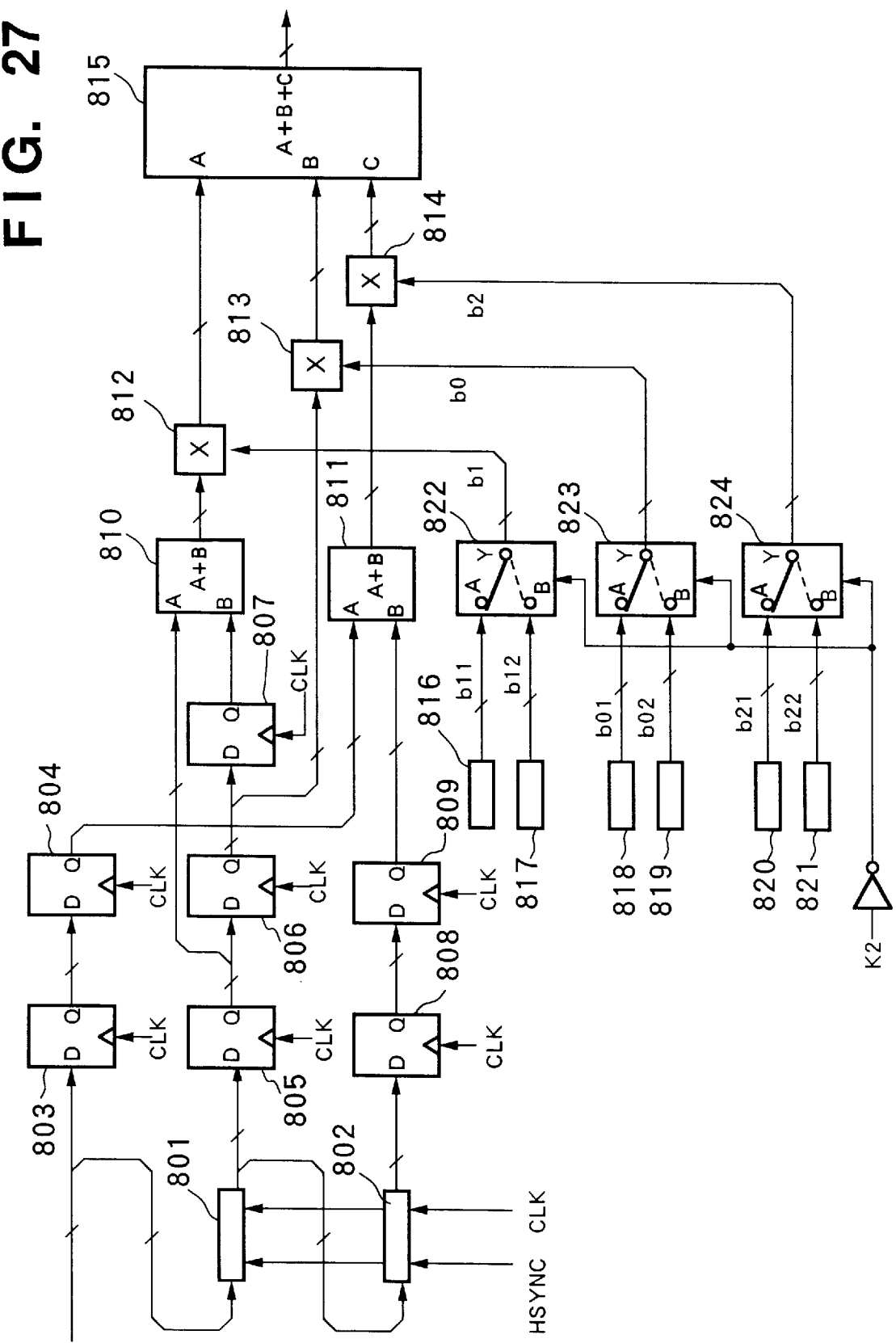
FIG. 27 is a block diagram showing the construction of a space filer 121 in FIG. 2.

FIG. 27 is a block diagram showing the space filter 121 (the space filters 121', 121'', 121''' are identically constructed). Numerals 801, 802 denote line memories each for applying a one-line delay, and numerals 803, 804, 805, 806, 807, 808, 809 denote flip-flops each for applying a delay of one pixel. Numerals 810, 811 denote adders, and numerals 812, 813, 814 denote multipliers for multiplying by coefficients $b_1$, $b_0$, $b_2$. The outputs of these multipliers are added by an adder 815.

Registers 816, 817, 818, 819, 820, 821 hold values $b_{11}$, $b_{12}$, $b_{01}$, $b_{02}$, $b_{21}$, $b_{22}$, respectively. Selectors 822, 823, 824 select the values of $b_1$, $b_0$, $b_2$ in accordance with the character decision signal $K_2$, and these values are outputted.

FIG. 28 illustrates the relation between $K_2$ and $b_0$, $b_1$, $b_2$. For example, if values of $b_{01}=4/8$, $b_{11}=1/8$, $b_{21}=1/8$, $b_{02}=12/8$, $b_{12}=-1/8$, $b_{22}=-1/8$ have been set in the registers 816, 817, 818, 819, 820, 821 in advance, a smoothing filter is formed at $K_2=0$, namely in a non-character (line-drawing) portion, as shown in FIG. 28, so that noise in the high-frequency components of the image can be eliminated. At $K_2=1$, namely in a character (line-drawing) portion, an edge emphasizing filter can be formed to correct for sharpness of character portions.

[Pixel correcting circuit]

Figure 5:
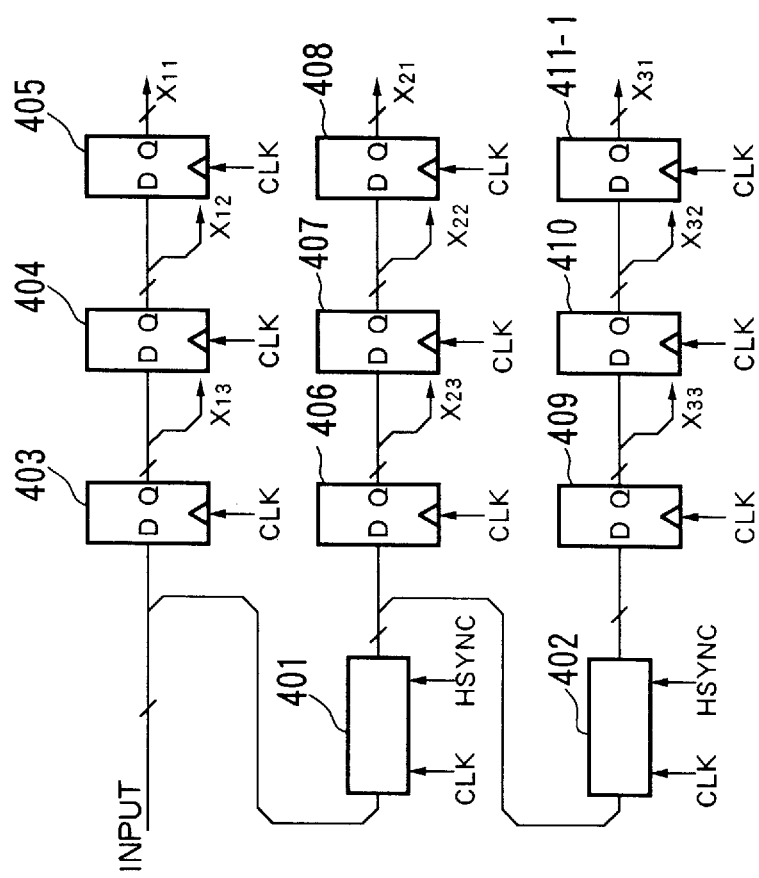
FIGS. 5 and 6 are block diagrams of a pixel correcting circuit.
Figure 6:
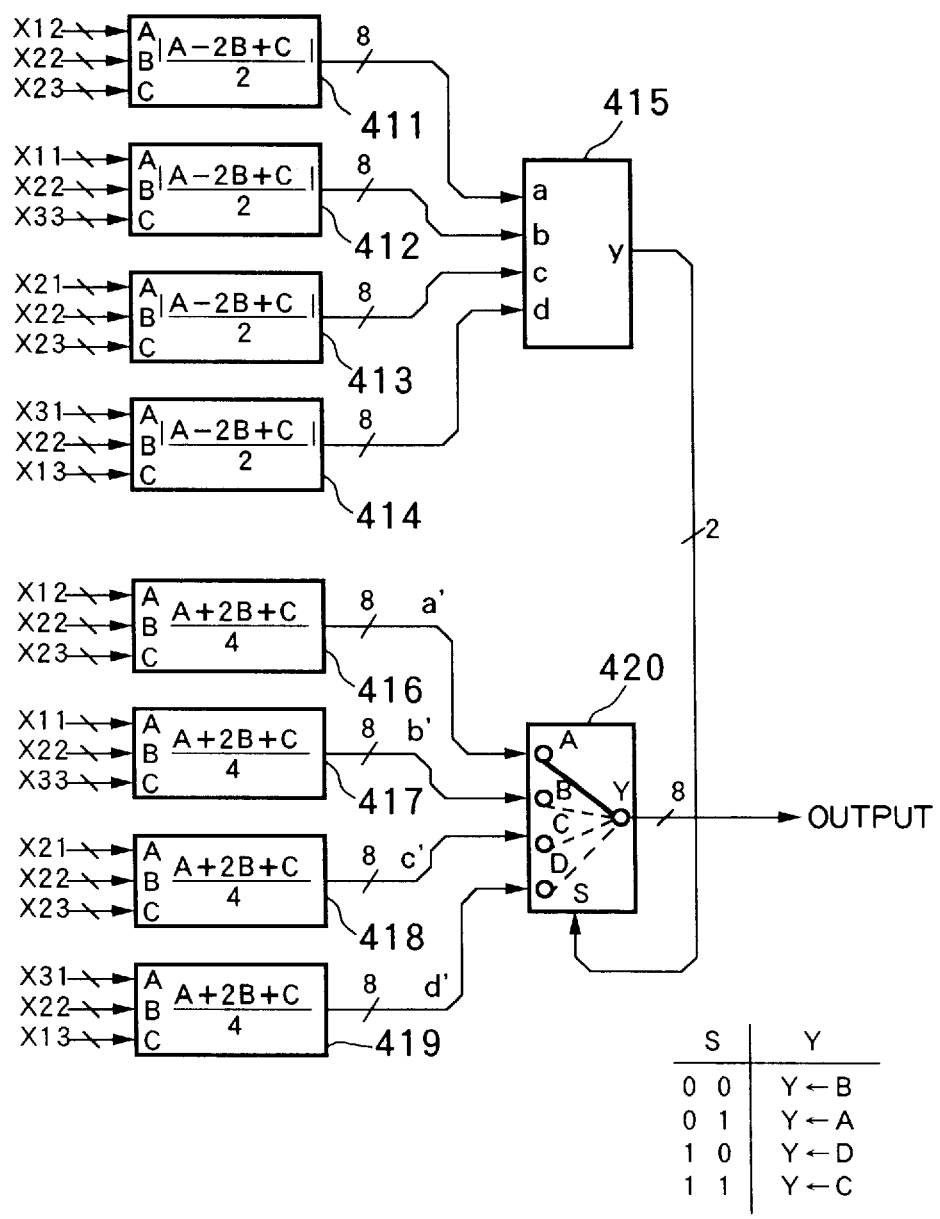
Figure 10:
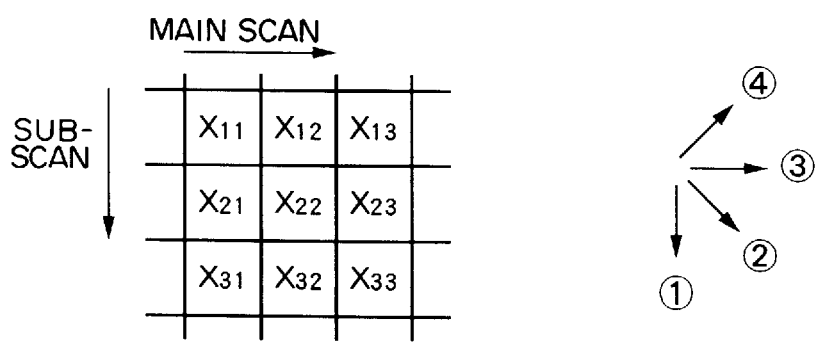
FIG. 10 is a diagram for describing directions in which a pixel edge is detected.

FIGS. 5 and 6 are block diagrams of the pixel correcting circuit 122 (the pixel correcting circuits 122', 122'', 122''' are identical in construction). CLK represents the pixel synchronizing signal, and HSYNC represents the horizontal synchronizing signal. Delay lines 401, 402 each apply a delay of one line. Flop-flops 403, 404, 405, 406, 407, 408, 409, 410, 411-1 each apply a delay of one pixel. These components cooperate to output the eight peripheral pixels $X_{11}$, $X_{12}$, $X_{13}$, $X_{21}$, $X_{23}$, $X_{31}$, $X_{32}$, $X_{33}$ centered on the pixel $X_{22}$, which is the pixel of interest, as shown in FIG. 10.

Figure 9:
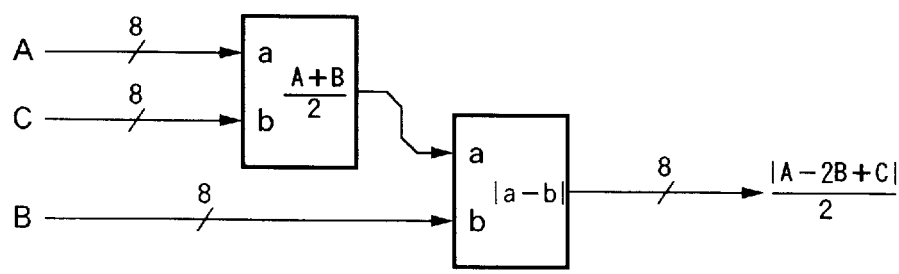
FIG. 9 is a block diagram showing a pixel-edge detecting circuit in FIG. 6.

Numerals 411, 412, 413, 414 denote pixel-edge detecting circuits each of which receives three inputs A, B, C and outputs a value of $|A - 2B + C|/2$, as shown in FIG. 9. The B input of each of these pixel-edge detecting circuits is the pixel $X_{22}$ of interest.

The A and C inputs of the edge detecting circuit 411 are $X_{12}$ and $X_{32}$, respectively, as a result of which $|X_{12} - 2X_{22} + X_{32}|/2$ is outputted. This is the absolute value of a quadratic differential quantity in the sub-scan direction indicated at $\hat{1}$ in FIG. 10. Thus, the edge detecting circuit 411 outputs the intensity of the edge in the sub-scan direction $\hat{1}$. The larger the value representing the length of the edge, the steeper the change in density in this direction.

The A and C inputs of the edge detecting circuit 412 are $X_{11}$ and $X_{33}$, respectively, as a result of which $|X_{11}-2X_{22}+X_{33}|/2$ is outputted. This is the absolute value of a quadratic differential quantity in a direction inclined downwardly to the right indicated at $\hat{2}$ in FIG. 10. Thus, the edge detecting circuit 412 outputs the intensity of the edge in the direction inclined downwardly to the right $\hat{2}$.

The A and C inputs of the edge detecting circuit 413 are $X_{21}$ and $X_{23}$, respectively, as a result of which $|X_{21}-2X_{22}+X_{23}|/2$ is outputted. This is the absolute value of a quadratic differential quantity in the main-scan direction indicated at $\hat{3}$ in FIG. 10. Thus, the edge detecting circuit 413 outputs the intensity of the edge in the main-scan direction $\hat{3}$.

The A and C inputs of the edge detecting circuit 414 are $X_{31}$ and $X_{13}$, respectively, as a result of which $|X_{31}-2X_{22}+X_{13}|/2$ is outputted. This is the absolute value of a quadratic differential quantity in a direction inclined upward to the right at $\hat{4}$ in FIG. 10. Thus, the edge detecting circuit 414 outputs the intensity of the edge in the direction inclined upwardly to the right $\hat{2}$.

Numeral 415 in FIG. 6 denotes a maximum-value detecting circuit having four input signals a, b, c and d. This circuit determines which of these input signals is largest and outputs a two-bit signal y indicating the result of the determination. The details of the maximum-value detecting circuit 415 are illustrated in FIG. 7.

Figure 7:
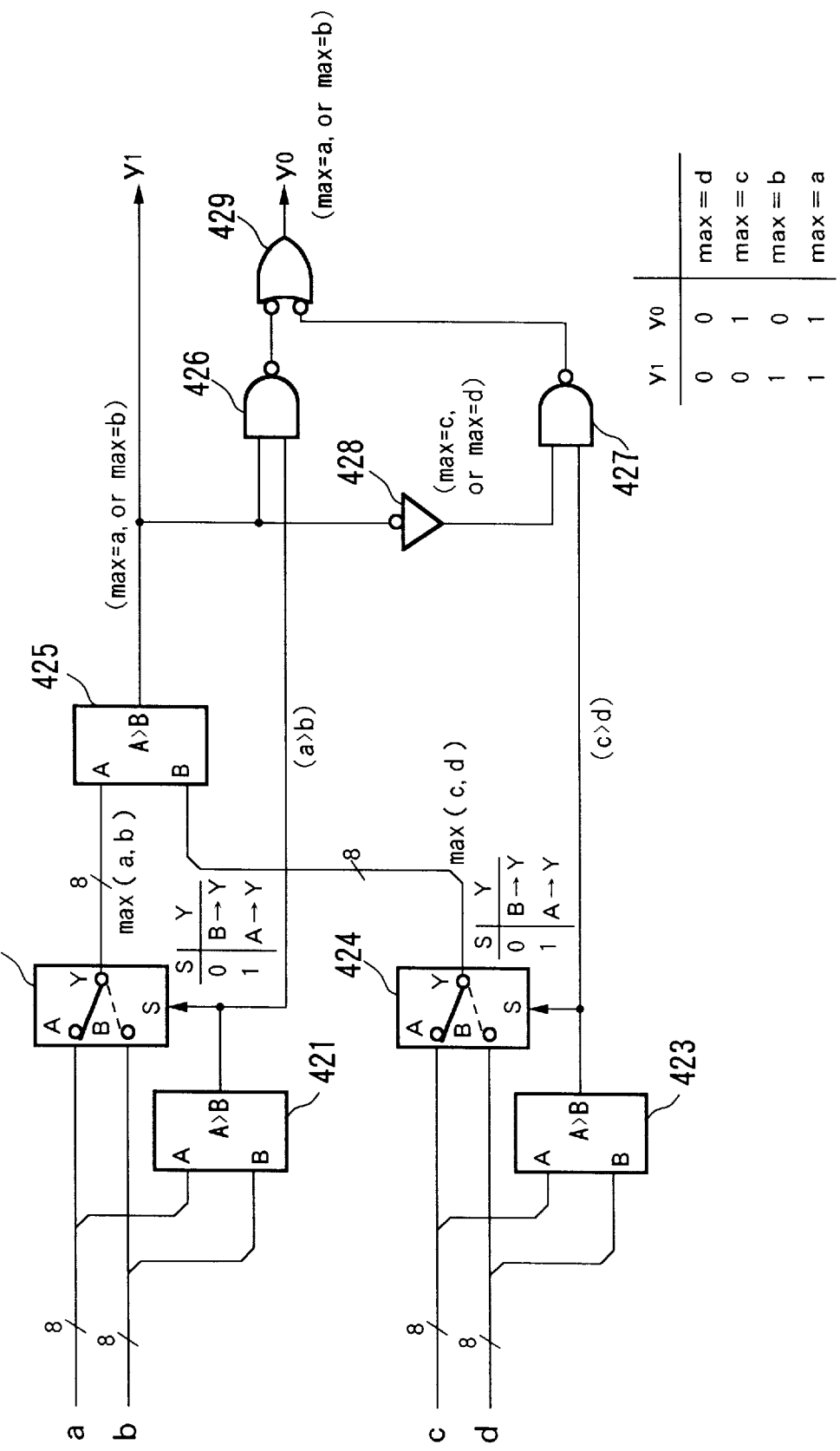
FIG. 7 is a block diagram showing a maximum-value detecting circuit in FIG. 6.

As shown in FIG. 7, the circuit 415 includes a comparator 421 for comparing a and b and outputting "1" only when a>b holds, and a 2-to-1 selector 422 whose A and B input terminals receive a and b, respectively, and whose select signal terminal S receives the output signal of the comparator 421. As a result, the selector 422 outputs the maximum value max(a,b) of a, b. Also included are a comparator 423 and a selector 424, which cooperate to output the result of comparing c and d as well as the maximum value max(c,d) of c, d.

Furthermore, the maximum value max(a,b) of a, b and the maximum value max(c,d) of c,d are compared by a comparator 425, which outputs a signal $y_1$. As a result, the signal $y_1$ becomes logical "1" when the value of maximum value max(a,b,c,d) of a, b, c, d is a or b [and becomes logical "0" when the value of maximum value max(a,b,c,d) of a, b, c, d is c or d].

Further included are an inverter 428 and two-input NAND gates 426, 427, 428. These cooperate so that a signal y0 becomes logical "1" when the value of maximum value max(a,b,c,d) of a, b, c, d is a or c [and becomes logical "0" when the value of maximum value max(a,b,c,d) of a, b, c, d is b or d].

More specifically, the outputs $y_0$, $y_1$ of two bits from the maximum-value detecting circuit become as follows depending upon the value of maximum value max(a,b,c,d) of a, b, c, d:

$y_0=1$, $y_1=1$ when max(a,b,c,d)=a holds;
$y_0=0$, $y_1=1$ when max(a,b,c,d)=b holds;
$y_0=1$, $y_1=0$ when max(a,b,c,d)=c holds; and
$y_0=0$, $y_1=0$ when max(a,b,c,d)=d holds.

Figure 8:
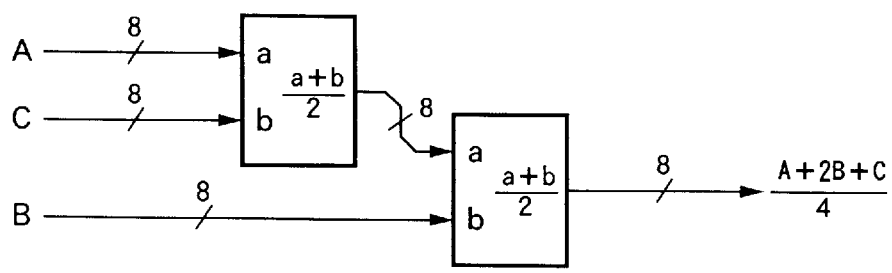
FIG. 8 is a block diagram showing a smoothing circuit in FIG. 6.

Numerals 416, 417, 418, 419 in FIGS. 5 and 6 denote smoothing circuits each of which receives three inputs A, B, C and outputs a value of $|A+2B+C|/4$, as shown in FIG. 8. The B input of each of these smoothing circuits is the pixel X22 of interest.

The A and C inputs of the smoothing circuit 416 are $X_{12}$ and $X_{32}$, respectively, as a result of which $|X_{12}+2X_{22}+X_{32}|/4$ is outputted. This is smoothing processing in the sub-scan direction indicated at $\hat{1}$ in FIG. 10.

The A and C inputs of the smoothing circuit 417 are $X_{11}$ and $X_{33}$, respectively, as a result of which $|X_{11}+2X_{22}+X_{33}|/4$ is outputted. This is smoothing processing in the direction inclined downwardly to the right indicated at $\hat{2}$ in FIG. 10.

The A and C inputs of the smoothing circuit 418 are $X_{21}$ and $X_{23}$, respectively, as a result of which $|X_{21}+2X_{22}+X_{23}|/4$ is outputted. This is smoothing processing in the main-scan direction indicated at $\hat{3}$ in FIG. 10.

The A and C inputs of the smoothing circuit 419 are $X_{31}$ and $X_{13}$, respectively, as a result of which $|X_{31}+2X_{22}+X_{13}|/4$ is outputted. This is smoothing processing in the direction inclined upwardly to the right indicated at $\hat{4}$ in FIG. 10.

Numeral 420 denotes a 4-to-1 selector that operates in accordance with the following logic with regard to the four input signals A, B, C, D and the two-bit select signal S:

the B input is delivered (Y←B) when S=00 holds;
the A input is delivered (Y←A) when S=01 holds;
the D input is delivered (Y←D) when S=10 holds; and
the C input is delivered (Y←C) when S=11 holds.

Accordingly, the final output of the pixel correcting circuit is as follows:

smoothing is performed in the direction $\hat{3}$ when the edge quantity in the direction $\hat{1}$ is maximum;
smoothing is performed in the direction $\hat{4}$ when the edge quantity in the direction $\hat{2}$ is maximum;
smoothing is performed in the direction $\hat{3}$ when the edge quantity in the direction $\hat{3}$ is maximum; and
smoothing is performed in the direction $\hat{2}$ when the edge quantity in the direction $\hat{4}$ is maximum.

[Results of pixel correction]

Figure 33:
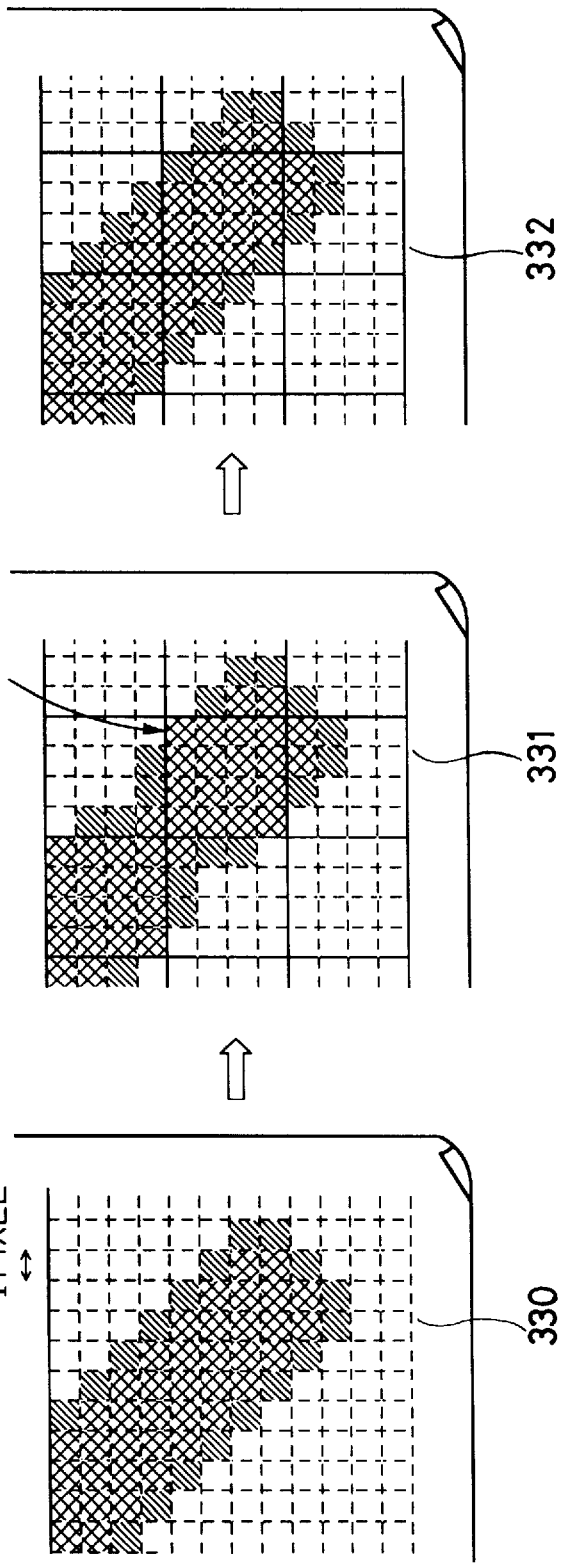
FIG. 33 is a diagram showing the details of processing for pixel correction in this embodiment.

FIG. 33 illustrates the results of image correction. In a case where an image having a density pattern of the kind shown at 330 in FIG. 33 is subjected to coding/decoding processing by block coding, a jagged contour in units of 4×4 pixels appears owing to coding error, as illustrated at 331. By applying the above-described smoothing processing to the image 331, the jagged contour is smoothened, as shown at 332. For example, since a pixel indicated at A in image 331 is decoded to a high density in comparison with the pixel corresponding to A in image 330, this is a cause of a jagged image. Since the edge quantity (density slope) in the direction $\hat{4}$ in FIG. 10 is greater than the edge quantity in other directions at the A pixel in image 331, smoothing is performed in the direction $\hat{2}$, which is perpendicular to the direction $\hat{2}$, and density is corrected so as to be lower. A similar correction is applied also to the other pixels so that the jaggies are mitigated overall, as indicated in image 332. Further, since smoothing processing is applied in a direction orthogonal to the density slope, the sharpness of character portions is not lost.

In accordance with the first embodiment, as described above, the image processing apparatus of the invention includes means for subdividing a full-color image signal into pixel blocks of m×n pixels (where m and n are natural numbers), means for separating the full-color image signal into lightness information and chromaticity information, means for separating the lightness information within the pixel blocks into a DC component and an AC component and quantizing these components, means for calculating the amplitude of the AC component of the lightness information, means for calculating the amplitude of the AC component of the chromaticity information, and means for calculating and coding the ratio of the amplitude of the AC component of the lightness information to the amplitude of the AC component of the chromaticity information, thereby making it possible to realize highly efficient coding (coding with smaller code length at the same deterioration in picture quality or coding with little deterioration in picture quality at the same code length).

(Second Embodiment)

The present invention is not limited to the embodiment described above. A second embodiment will be described with reference to FIG. 38.

Figure 38:
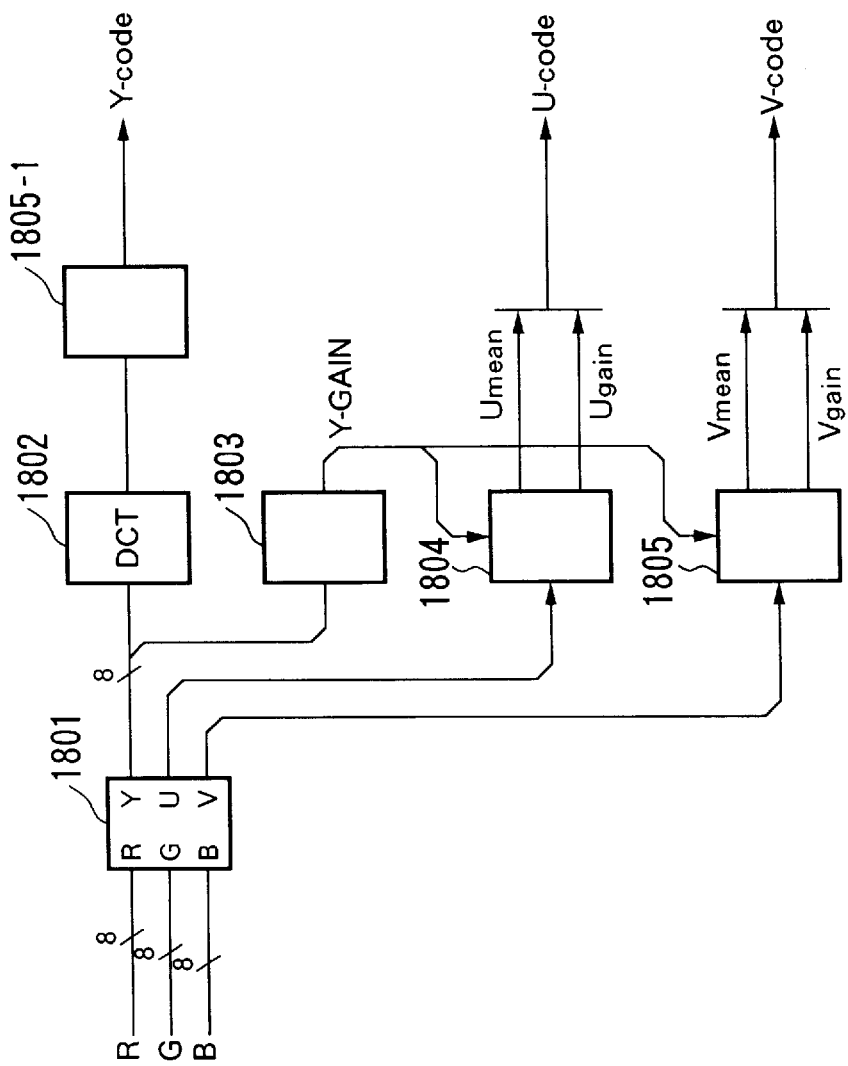
FIG. 38 is a circuit diagram showing an example of a coder of a full-color image.

FIG. 38 illustrates an example of a coder for coding a full-color image. A full-color image signal separated into the colors red (R), green (G) and blue (B) is converted into Y, U, V signals in a converter circuit 1801 as indicated by Equation (14) below.

$$Y = c_1 R + c_2 B + c_3 B$$

$$U = c_4 (R-Y)$$

$$V = c_5 (B-Y) \quad (14)$$

where $c_1$, $c_2$, $c_3$, $c_4$, $c_5$ represent constants.

Here Y is a signal representing lightness information in the same manner as L*, and U, V are signals representing chromaticity in the same manner as a* and b*. A discrete-cosine transformation circuit 1802 applies a discrete cosine transformation to n×n (where n is a power of 2; n=4, 8, 16, 32 . . . ). The Y signal is expanded into spatial frequency components by the discrete cosine transformation, and the results are coded as by Huffman coding using a coder 1805-1. Furthermore, the amplitude Y-GAIN of the Y signal in the n×n pixels is calculated by a Y-amplitude detector 1803 in the same manner as performed by the circuit 715.

Numeral 1804 denotes a circuit similar to the circuit 7204. This circuit outputs $U_{gain}$, which is the ratio of the amplitude of the U signal to the amplitude of the Y signal, and $U_{mean}$, which is the DC component of the U signal. These signals are delivered in combination as U-code. Similarly, numeral 1805 denotes a circuit similar to the circuit 7204. This circuit outputs $V_{gain}$, which is the ratio of the amplitude of the V signal to the amplitude of the Y signal, and $V_{mean}$, which is the DC component of the V signal. These signals are delivered in combination as V-code.

The signals Y-code, U-code and V-code are combined to form the code of the image data.

Though the decoder is not shown, this may be constructed using a look-up table, in the same manner as illustrated in FIGS. 1 and 2. The signal Y-code is applied to the look-up table as an input, and the table outputs results obtained by applying a discrete reverse cosine transformation to the spatial frequency component corresponding to Y-code.

(Third Embodiment)

The invention is not limited to the foregoing embodiments. For example, the invention may be practiced by YIQ, L*u*v* or all color spaces similar thereto as a method of separating a color signal into lightness information or chromaticity information.

Further, with regard to the coding method also, the size of a pixel block used when performing image coding may be applied generally to an m×n pixel block. The method of coding lightness information also is not limited to orthogonal transformation but may be selected at will.

The present invention can be applied to a system constituted by a plurality of devices or to an apparatus comprising a single device. Furthermore, it goes without saying that the invention is applicable also to a case where the object of the invention is attained by supplying a program to a system or apparatus.

In accordance with the present invention, as described above, it is possible to realize highly efficient coding (coding with smaller code length at the same deterioration in picture quality or coding with little deterioration in picture quality at the same code length).

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting lightness information of a block of pixel data comprised of a plurality of pixels and chromaticity information of the block of pixel data;

first extracting means for extracting an amplitude value of the lightness information from the block of pixel data;

second extracting means for extracting an amplitude value of the chromaticity information from the block of pixel data; and coding means for coding the chromaticity information based upon a ratio of the amplitude value of the chromaticity information to the amplitude value of the lightness information;

wherein the amplitude value of the lightness information corresponds to a difference between maximum and minimum values of the lightness information for the block of pixel data, and the amplitude value of the chromaticity information corresponds to a difference between chromaticity values at maximum and minimum lightness values in the block of pixel data.

2. The apparatus according to claim 1, further comprising orthogonal transformation means for converting the lightness information into frequency information.

3. The apparatus according to claim 2, wherein said first extracting means includes:

lightness-difference calculating means for calculating, as the amplitude of the lightness information, a difference between a maximum lightness value and a minimum lightness value in the block of pixel data; and position detecting means for detecting a pixel position of the maximum lightness value and a pixel position of the minimum lightness value in the block of pixel data; and wherein said second extracting means includes:

chromaticity-amplitude calculating means for calculating, as the amplitude of the chromaticity information, a difference between the chromaticity at the pixel position of the maximum lightness value and the chromaticity at the pixel position of the minimum lightness value detected by said position detecting means.

4. The apparatus according to claim 1, further comprising:

first discriminating means for determining whether the block of pixel data is situated in a black area, said first discriminating means providing a first result;

second discriminating means for determining whether the block of pixel data is situated in a character area, said second discriminating means providing a second result;

memory means for storing the first result and the second result, with the chromaticity information coded by said coding means.

5. The apparatus according to claim 1, wherein said input means comprises reading means for scanning an original to produce the pixel data and processing means for generating a plurality of color component signals from the pixel data.

6. The apparatus according to claim 5, further comprising converting means for converting the plurality of color component signals into the lightness information and the chromaticity information.

7. The apparatus according to claim 1, wherein said coding means includes a plurality of look-up tables.

8. The apparatus according to claim 7, wherein each of said plurality of look-up tables comprises a Read-Only Memory (ROM).

9. An image processing apparatus comprising:
receiving means for receiving coded lightness information of a block of pixel data comprised of a plurality of pixels and coded chromaticity information of the block of pixel data, the coded lightness information including a DC component and a plurality of AC components, the coded chromaticity information being based upon a ratio of an amplitude value of chromaticity information to an amplitude value of lightness information, and also being based upon an average value of the chromaticity information; and
decoding means for decoding the coded lightness information and the coded chromaticity information;
wherein the amplitude value of the lightness information corresponds to a difference between maximum and minimum values of the lightness information for the block of pixel data, and the amplitude value of the chromaticity information corresponds to a difference between chromaticity values at maximum and minimum lightness values in the block of pixel data.

10. The apparatus according to claim 9, wherein said decoding means includes a plurality of look-up tables.

11. The apparatus according to claim 10, wherein each of said plurality of look-up tables comprises a Read-Only Memory (ROM).

12. The apparatus according to claim 9, further comprising converting means for converting the lightness information and the chromaticity information into a color component signal.

13. The apparatus according to claim 12, further comprising filter means for generating a spatial frequency characteristic of the color component signal.

14. The apparatus according to claim 12, further comprising a recording station for recording an image on a medium based on the color component signal.

15. An image processing method comprising:
an input step for inputting lightness information of a block of pixel data comprised of a plurality of pixels and chromaticity information of the block of pixel data;
a first extracting step for extracting an amplitude value of the lightness information from the block of pixel data;
a second extracting step for extracting an amplitude value of the chromaticity information from the block of pixel data; and
a coding step for coding the chromaticity information based upon a ratio of the amplitude value of the chromaticity information to the amplitude value of the lightness information;
wherein the amplitude value of the lightness information corresponds to a difference between maximum and minimum values of the lightness information for the block of pixel data, and the amplitude value of the chromaticity information corresponds to a difference between chromaticity values at maximum and minimum lightness values in the block of pixel data.

16. An image processing method comprising:
a receiving step for receiving coded lightness information of a block of pixel data comprised of a plurality of pixels and coded chromaticity information of the block of pixel data, the coded lightness information including a DC component and a plurality of AC components, the coded chromaticity information being based upon a ratio of an amplitude value of chromaticity information to an amplitude value of lightness information, and also being based upon an average value of the chromaticity information; and
a decoding step for decoding the coded lightness information and the coded chromaticity information;
wherein the amplitude value of the lightness information corresponds to a difference between maximum and minimum values of the lightness information for the block of pixel data, and the amplitude value of the chromaticity information corresponds to a difference between chromaticity values at maximum and minimum lightness values in the block of pixel data.

17. An image processing apparatus comprising:
input means for inputting lightness information of a block of pixel data comprised of a plurality of pixels and chromaticity information of the block of pixel data;
first extracting means for extracting an amplitude value of the lightness information from the block of pixel data;
second extracting means for extracting an amplitude value of the chromaticity information from the block of pixel data; and
coding means for coding the chromaticity information based upon a ratio of the amplitude value of the chromaticity information to the amplitude value of the lightness information;
wherein the amplitude value of the lightness information is based on maximum and minimum values of the lightness information for the block of pixel data, and the amplitude value of the chromaticity information is based on the maximum and the minimum values of the lightness information for the block of pixel data.

18. The apparatus according to claim 17, further comprising orthogonal transformation means for converting the lightness information into frequency information.

19. The apparatus according to claim 18, wherein the first extracting means includes:
lightness-difference calculating means for calculating, as the amplitude of the lightness information, a difference between a maximum lightness value and a minimum lightness value in the block of pixel data; and
position detecting means for detecting a pixel position of the maximum lightness value and a pixel position of the minimum lightness value in the block of pixel data; and
wherein said second extracting means includes:
chromaticity-amplitude calculating means for calculating, as the amplitude of the chromaticity information, a difference between the chromaticity at the pixel position of the maximum lightness value, and the chromaticity at the pixel position of the minimum lightness value detected by the position detecting means.

20. The apparatus according to claim 17, further comprising:
first discriminating means for discriminating whether the block of pixel data is situated in a black area, the first discriminating means providing a first result; and
second discriminating means for discriminating whether the block of pixel data is situated in a character area, the second discriminating means providing a second result;
memory means for storing the first result and the second result with the chromaticity information coded by the coding means.

21. The apparatus according to claim 17, wherein the input means comprises reading means for scanning an original to produce the pixel data and processing means for generating a plurality of color component signals from the pixel data.

22. The apparatus according to claim 21, further comprising converting means for converting the plurality of color component signals into the lightness information and the chromaticity information.

23. The apparatus according to claim 17, wherein the coding means includes a plurality of look-up tables.

24. The apparatus according to claim 23, wherein each of the plurality of look-up tables comprises a read-only memory (ROM).

25. An image processing apparatus comprising:

receiving means for receiving coded lightness information of a block of pixel data comprised of a plurality of pixels and coded chromaticity information of the block of pixel data, the coded lightness information including a DC component and a plurality of AC components, the coded chromaticity information being based upon a ratio of an amplitude value of chromaticity information to an amplitude value of lightness information, and also being based upon an average value of the chromaticity information; and decoding means for decoding the coded lightness information and the coded chromaticity information;

wherein the amplitude value of the lightness information is based on maximum and minimum values of the lightness information for the block of pixel data, and the amplitude value of the chromaticity information is based on the maximum and the minimum values of the lightness information for the block of pixel data.

26. The apparatus according to claim 25, wherein the decoding means includes a plurality of look-up tables.

27. The apparatus according to claim 26, wherein each of the plurality of look-up tables comprises a read-only memory (ROM).

28. The apparatus according to claim 25, further comprising converting means for converting the lightness information and the chromaticity information into a color component signal.

29. The apparatus according to claim 28, further comprising filter means for generating spatial frequency characteristics of the color component signal.

30. The apparatus according to claim 25, further comprising a recording station for recording an image on a medium based on the color component signal.

31. An image processing method comprising:

an input step for inputting lightness information of a block of pixel data comprised of a plurality of pixels and chromaticity information of the block of pixel data;

a first extracting step for extracting an amplitude value of the lightness information from the block of pixel data;

a second extracting step for extracting an amplitude value of the chromaticity information from the block of pixel data; and a coding step for coding the chromaticity information based upon a ratio of the amplitude value of the chromaticity information to the amplitude value of the lightness information;

wherein the amplitude value of the lightness information is based on maximum and minimum values of the lightness information for the block of pixel data, and the amplitude value of the chromaticity information is based on the maximum and the minimum values of the lightness information for the block of pixel data.

32. An image processing method comprising:

a receiving step for receiving coded lightness information of a block of pixel data comprised of a plurality of pixels and coded chromaticity information of the block of pixel data, the coded lightness information including a DC component and a plurality of AC components, the coded chromaticity information being based upon a ratio of an amplitude value of chromaticity information to an amplitude value of lightness information, and also being based upon an average value of the chromaticity information; and a decoding step for decoding the coded lightness information and the coded chromaticity information;

wherein the amplitude value of the lightness information is based on maximum and minimum values of the lightness information for the block of pixel data, and the amplitude value of the chromaticity information is based on the maximum and the minimum values of the lightness information for the block of pixel data.

* * * * *

UNITED STATES PATENT AND TRADEMARK OFFICE
CERTIFICATE OF CORRECTION

PATENT NO. : 5,838,817

DATED : November 17, 1998

INVENTOR : MASAHIRO FUNADA

It is certified that error appears in the above-identified patent and that said Letters Patent is hereby corrected as shown below:

COLUMN 5

Line 53, delete "15".

COLUMN 9

Line 57, "matrix Y" should read --matrix $Y_{ij}$--.

COLUMN 19

Line 38, "Bk=min($M_1.C_1,Y_1$)" should read --$Bk_1$=min($M_1.C_1,Y_1$)--.

COLUMN 20

Line 65, "$\hat{1}$" should read --①--.

Line 67, "$\hat{1}$." should read --①.--.

UNITED STATES PATENT AND TRADEMARK OFFICE
CERTIFICATE OF CORRECTION

PATENT NO. : 5,838,817

DATED : November 17, 1998

INVENTOR : MASAHIRO FUNADA

It is certified that error appears in the above-identified patent and that said Letters Patent is hereby corrected as shown below:

COLUMN 21

Line 7, "$\hat{2}$" should read --②--.

Line 9, "$\hat{2}$." should read --②.--.

Line 13, "$\hat{3}$" should read --③--.

Line 14, "$\hat{3}$." should read --③.--.

Line 19, "$\hat{4}$" should read --④--.

Line 21, "$\hat{2}$." should read --④.--.

Line 67, "$\hat{1}$" should read --①--.

COLUMN 22

Line 4, "$\hat{2}$" should read --②--.

UNITED STATES PATENT AND TRADEMARK OFFICE
CERTIFICATE OF CORRECTION

PATENT NO. : 5,838,817

DATED : November 17, 1998

INVENTOR : MASAHIRO FUNADA

Page 3 of 4

It is certified that error appears in the above-identified patent and that said Letters Patent is hereby corrected as shown below:

COLUMN 22

Line 8, "$\hat{3}$" should read --③--.

Line 12, "$\hat{4}$" should read --④--.

Line 23, "$\hat{3}$" should read --③--.

Line 24, "$\hat{1}$" should read --①--.

Line 25, "$\hat{4}$" should read --④--.

Line 26, "$\hat{2}$" should read --②--.

Line 27, "$\hat{3}$" should read --①--.

Line 28, "$\hat{3}$" should read --③--.

Line 29, "$\hat{2}$" should read --②--.

UNITED STATES PATENT AND TRADEMARK OFFICE
CERTIFICATE OF CORRECTION

PATENT NO. : 5,838,817

DATED : November 17, 1998

INVENTOR : MASAHIRO FUNADA

It is certified that error appears in the above-identified patent and that said Letters Patent is hereby corrected as shown below:

COLUMN 22

Line 30, "$\hat{4}$" should read --④--.

Line 43, "$\hat{4}$" should read --④--.

Line 45, "$\hat{2}$" should read --②--.

Line 46, "$\hat{2}$," should read --④,--.

Signed and Sealed this

Seventeenth Day of August, 1999

Attest:

Q. TODD DICKINSON

Attesting Officer

Acting Commissioner of Patents and Trademarks